United States Patent

Marcotte

(10) Patent No.: US 9,864,774 B2
(45) Date of Patent: Jan. 9, 2018

(54) GRANULAR BUFFERING OF METADATA CHANGES FOR JOURNALING FILE SYSTEMS

(71) Applicant: International Business Machines Corporation, Armonk, NY (US)

(72) Inventor: Scott T. Marcotte, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 14/746,968

(22) Filed: Jun. 23, 2015

(65) Prior Publication Data

US 2016/0378818 A1    Dec. 29, 2016

(51) Int. Cl.
*G06F 17/00* (2006.01)
*G06F 17/30* (2006.01)
*G06F 11/14* (2006.01)

(52) U.S. Cl.
CPC .... *G06F 17/30377* (2013.01); *G06F 11/1471* (2013.01); *G06F 17/30132* (2013.01); *G06F 17/30144* (2013.01); *G06F 17/30203* (2013.01)

(58) Field of Classification Search
CPC .............. G06F 17/30; G06F 17/30377; G06F 17/30132; G06F 17/30144
USPC .................................................. 707/600–899
See application file for complete search history.

(56) References Cited

U.S. PATENT DOCUMENTS

| 6,032,216 | A | 2/2000 | Schmuck et al. |
| 6,732,124 | B1 | 5/2004 | Koseki et al. |
| 7,606,841 | B1 | 10/2009 | Ranade |
| 2009/0150599 | A1* | 6/2009 | Bennett .............. G06F 11/1441 711/103 |
| 2014/0310473 | A1 | 10/2014 | Bilas et al. |
| 2014/0325158 | A1 | 10/2014 | Aronovich et al. |

OTHER PUBLICATIONS

List of IBM Patents or Patent Applications Treated as Related (Appendix P), filed herewith.
U.S. Appl. No. 14/857,329, filed Sep. 17, 2015.
Hisgen et al., "New-Value Logging in the Echo Replicated File System", Digital Equipment Corporation, Systems Research Center, Jun. 23, 1993, pp. 1-47.

(Continued)

*Primary Examiner* — Isaac M Woo
(74) *Attorney, Agent, or Firm* — Daniel R. Simek

(57) ABSTRACT

Responsive to determining an in-memory image of a metadata disk block, a buffer is generated in memory and includes metadata updates made to the metadata disk block. Metadata updates to the disk block by a first transaction are recorded and stored in the buffer. Transfer of metadata updates that are logically complete, but remain in an active transaction list stored in the buffer, are delayed to a completed transaction list, scheduled to be written to a log file on disk at a subsequent time. A determination is made as to whether the metadata disk block is deleted by a second transaction following the first, and responsive to determining the metadata disk block is to be deleted and the metadata updates of the second transaction transfer to the completed transaction list, preventing the writing of the metadata updates to the log file and the metadata disk block to disk.

13 Claims, 8 Drawing Sheets

(56) References Cited

OTHER PUBLICATIONS

Seltzer et al., "Journaling Versus Soft Updates: Asynchronous Meta-data Protection in File Systems", USENIX, Proceedings of the 2000 USENIX Annual Technical Conference, Jun. 18-23, 2000, San Diego, California, USA, Last changed: Feb. 7, 2002, pp. 1-17, <https://www.usenix.org/legacy/publications/library/proceedings/usenix2000/general/aron/aron_html/full_papers/seltzer/seltzer_html/>.
Vahalia et al., "Metadata Logging in an NFS Server", USENIX, Jan. 1995, pp. 1-19, printed on Dec. 23, 2014, <https://www.usenix.org/legacy/publications/library/proceedings/neworl/full_papers/vahalia.a>.

\* cited by examiner

GRANULAR BUFFERING OF METADATA CHANGES FOR JOURNALING FILE SYSTEMS

FIELD OF THE INVENTION

The present invention relates generally to the field of logging file system changes, and more particularly to granular metadata recording and buffering with fine grained locking.

BACKGROUND OF THE INVENTION

Many file systems use journaling of metadata updates in a log file, often referred to as a journal, to provide file system recovery in event of a system crash. Updates made to file system metadata, which includes data stored on disk that is not the contents of a user file, is recorded in a log file on disk. Writing to the log file is sufficient to allow recreation of the metadata in event of a system crash. If a system crashes, the log file is read and the metadata put into a consistent state by applying updates to the metadata and writing that data to its home location on disk. The log file is considered a circular file, and when it is near-full, or as it is about to "wrap", metadata that has been updated, or "dirty metadata" of the file system is written to disk to avoid overwriting of the oldest region of the log file. This ensures correctness when replaying the log if a system crash occurs. Updated metadata blocks are kept in a queue (sometimes called an age-queue) sorted by the oldest log page that describes updates to that block. This allows the log manager to quickly determine which blocks need to be written to disk, as the log file fills, to free up the oldest regions of the log file. The more metadata that has to be written when the log file is near-full, the longer it takes before a new transaction can start and overwrite the oldest region of the log file.

SUMMARY

Embodiments of the present invention provide a computer program product and a computer system for recording metadata updates of file systems. The method for recording metadata updates of file systems provides for one or more processors, responsive to determining an in-memory image of a metadata disk block, to generate a buffer, in which the buffer is generated in memory and includes metadata updates made to the in-memory image of the metadata disk block. One or more processors record at a granular level, the metadata updates made to the metadata disk block by a first transaction of a plurality of transactions. One or more processors store in the buffer, the metadata updates made to the metadata disk block by the first transaction. One or more processors delay a transfer of the metadata updates of the first transaction that are logically complete and are held in an active transaction list stored in the buffer, to a completed transaction list stored in the buffer, wherein the completed transaction list of metadata updates are written to the log file on disk at a subsequent time. One or more processors determine whether the metadata disk block is to be deleted by a second transaction following the first transaction of the plurality of transactions, and responsive to determining the metadata disk block is to be deleted, and the metadata updates of the second transaction have transferred to the completed transaction list, preventing the metadata updates of the logically completed transactions to be written to the log file on disk, and preventing the writing of the metadata disk block to disk.

DETAILED DESCRIPTION

Figure 1:
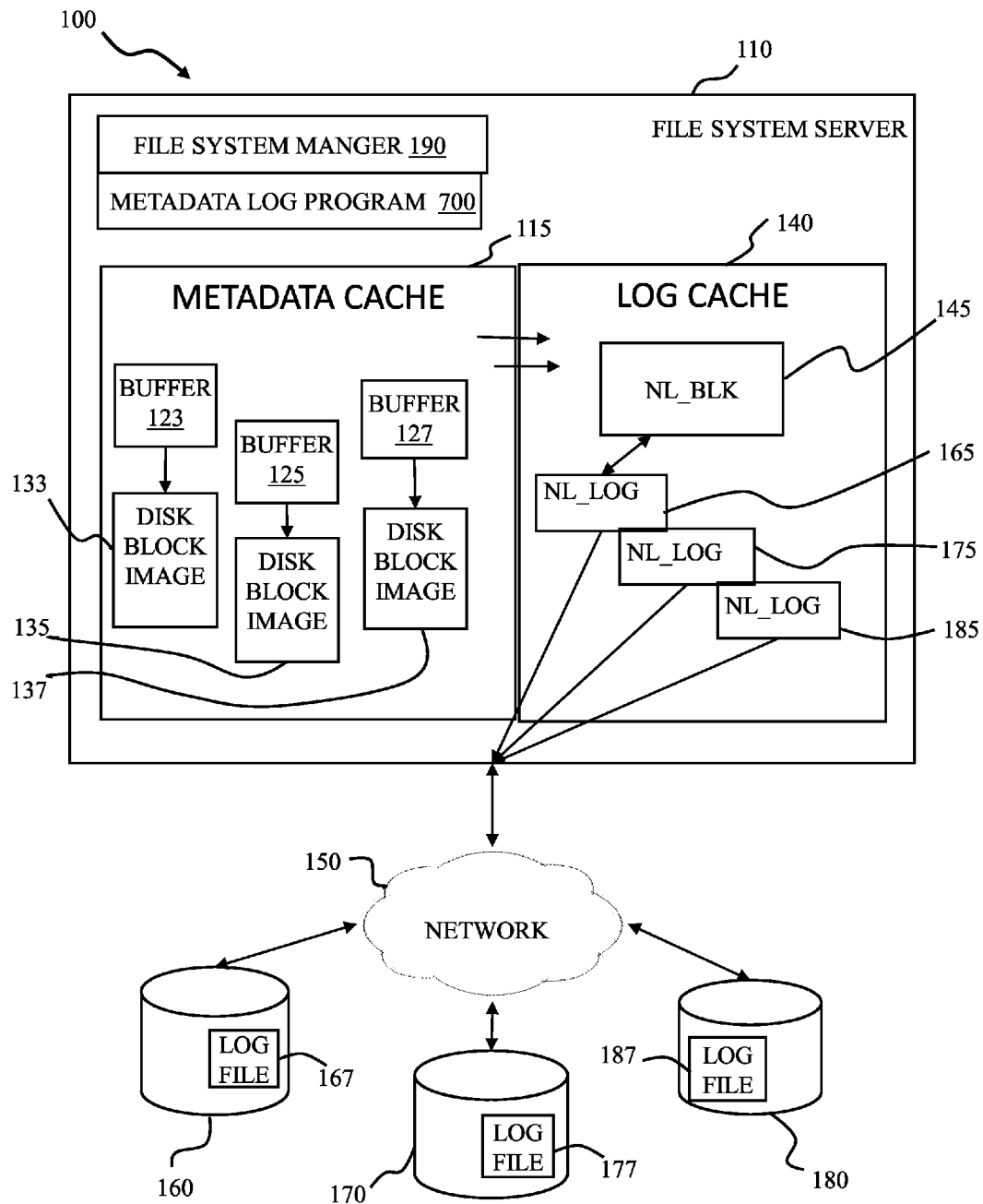
FIG. 1 is a functional block diagram illustrating a distributed file system journaling environment, in accordance with an embodiment of the present invention.

Embodiments of the present invention provide a method, computer program product, and computer system for journaling file systems that record updates to file system metadata in one or more hidden log files in a file system. In particular, it provides a system and method that uses granular metadata recording and buffering with fine grained locking to provide high performance with a low cost of implementation.

Some embodiments of the present invention include granular recording of individual updates (byte ranges) to metadata blocks with buffering and transaction equivalence mechanisms to ensure a log wraps as infrequently as possible. Granular recording with buffering takes advantage of the fact that subsequent transactions often update the same section of a metadata block. The granular recording includes fine grained locking, because each metadata block will keep two lists: a list of active transaction update records, and a list of completed transaction update records, in which updating a list is protected by the same lock that protects the metadata block. Thus two concurrent tasks updating different metadata blocks run in parallel in most cases.

Additionally, recording at a granular level, such as at a byte range, will also indicate when a block is being deleted by a transaction or when a metadata block is newly allocated for a transaction. Noting when a block has been deleted by a transaction is very powerful since queued byte range updates for that block can be discarded, greatly reducing bytes in a log. It's very common when removing many files, for example, that directory pages become empty, and in such cases the prior update records for that block can be discarded from memory since the transaction equivalence mechanism will only write the finalized block-delete transaction. Indicating when a block is new is useful for recovery, because prior updates in the log can be ignored and a disk read can be avoided. Still another aspect of granular recording is the concept of near-adjacency.

Subsequently described is the format of a log record entry, each log record has a header of approximately 20 bytes. Embodiments of the present invention determine that two byte ranges that are separated by less than the size of a log record header can be combined into one record and still reduce the number of bytes written to the log. (For example, byte range 0, 3 and 6, 10 are more effectively written as a single record of range 0, 10). This also keeps the byte range lists much shorter, which reduces processor costs and search time. Embodiments of the present invention make use of this feature, referred to herein as "near-adjacency".

Embodiments of the present invention include a feature described below as an active-delay mechanism. When a transaction logically completes, the byte range updates of the active transaction list are not immediately moved to the completed list, rather the byte range updates are kept in an active state (kept in an active transaction list) for a brief time in case another transaction starts in that time period and makes updates to the same or a near-adjacent byte range, which is a specified proximity byte range in which case the updates of the transactions are combined into a single update. This is useful because it's often the case that subsequent transactions will update the same metadata and delaying the movement of active records to the completed list reduces the merging of update records with previously completed transactions. One requirement of transaction buffering is that any update made by an active transaction to a byte range that is in the completed list has to make a copy of the updates in that range (if not already done).

Yet another aspect of the invention is an additional queue of buffers, described as an "oldest-last age queue of buffers", which is used in addition to a traditional age queue. The oldest-last age queue sorts buffers that have not been recently updated in order of the last page in the log file they update. This can be used to asynchronously schedule dirty metadata buffers to disk before the log file fills completely to avoid writing all metadata buffers to disk when the log file becomes full. Scheduling partial writes to disk reduces the time it takes to free the oldest log pages for recording of new transaction data.

Embodiments of the present invention will track each distinct byte range of a metadata block in memory, and when a task is scheduled to update a metadata block, the task provides a list of byte ranges to be altered, and the list is compared to the in-memory tracking list, which will be altered based on what is scheduled to be updated. As an alternative to recording several updates made to a metadata block from the removal of files and directories, only to have the block de-allocated (freed to be available for other files), it is much more efficient to determine that the block was "killed" and remove the entire in-memory tracking list for that block. This is illustrated by considering an example of a directory, which is a file that contains names of files that are included in the directory. Removing many files from the directory will repeatedly update the directory metadata tracking pages and, if the same pages become free, recording the previous changes made to the page is inconsequential. Recording the de-allocation of the block and ignoring the previous changes prior to the de-allocation saves the time of writing to the log file, and has less impact on performance.

The present invention will now be described in detail with reference to the Figures. FIG. 1 is a functional block diagram illustrating a distributed file system journaling environment, generally designated 100, in accordance with an embodiment of the present invention. Distributed file system journaling environment 100 includes file system server 110, which is depicted as including file system manager 190, and metadata log program 700, metadata cache 115, log cache 140 and file systems 160, 170, and 180, containing log files 167, 177, and 187, respectively, all connected via network 150. Metadata cache 115 is shown as including buffer structures 123, 125, and 127, as well as disk block images 133, 135, and 137. Log cache 140 is shown as including structures NL_BLK 145, and NL_LOGs 165, 175, and 185. FIG. 1 depicts a network connection between file systems 160, 170, and 180, and file system server 110, via network 150; however, in some embodiments of the present invention, one or more file systems, such as file systems 160, 170, and 180, may be directly connected to file system server 110.

File system server 110 performs transaction operations within distributed file system journaling environment 100, and includes file system manager 190, which performs operational management activity of the transactions performed by file system server 110. File system server 110 includes memory capacity supporting metadata cache 115 and log cache 140 and their respective data structures, such as buffers structures 123, 125, and 127, NL_BLK 145, and NL_LOGs 165, 175, and 185. File system server 110 enables the mounting of multiple file systems represented by, but not limited to, file systems 160, 170 and 180. File system server 110 may be a web server, a management server, a blade server, a mobile computing device, or other electronic device or computing system capable of receiving and sending data. In other embodiments, file system server 110 may represent a virtual computing device of a computing system utilizing multiple computers as a server system, such as in a cloud computing environment. In another embodiment, file system server 110 may be a laptop computer, a tablet computer, a netbook computer, a personal computer (PC), a desktop computer, a personal digital assistant (PDA), a smart phone, or programmable electronic device capable of performing the operational steps of metadata log program 700, via network 150. In another embodiment, file system server 110 represents a computing system utilizing clustered computers and components (e.g., database server computers, application server computers, etc.) that act as a single pool of seamless resources when accessed within distributed file system journaling environment 100. File system server 110 may include internal and external hardware components, as depicted and described with reference to FIG. 8.

Network 150 can be, for example, a local area network (LAN), a telecommunications network, a wide area network (WAN), such as the Internet, a virtual local area network (VLAN), or combination that can include wired, wireless, or optical connections. In general, network 150 can be combination of connections and protocols that will support communications between file systems 160, 170, and 180, file system server 110, file system manager 190, metadata log program 700, and data structure components of metadata cache 115 and log cache 140, in accordance with embodiments of the present invention.

Metadata cache 115 is a memory data structure of file system server 110, and includes the data structures of buffer structures 123, 125, and 127, and disk block images 133, 135, and 137. Embodiments of the present invention will load copies of disk blocks containing metadata associated with a transaction, such as disk block images 133, 135, and 137, to metadata cache 115. Metadata cache 115 works in tandem with log cache 140 to record updates to metadata in log cache 140 and ultimately write the updated metadata (dirty metadata) to disk when log files become full or additional log file space is needed for a scheduled transaction task. Disk block images 133, 135, and 137, have corresponding buffer structures 123, 125, and 127, respectively, which track the state of the in-memory disk block images 133, 135, 137, noting changes made to the metadata from transaction activity. The metadata updates are sent from the buffer structures of metadata cache 115 to log cache 140.

Log cache 140 is a memory data structure of file system server 110 that controls receipt, status and writing of metadata updates to a corresponding log file on disk. Log cache 140 includes NL_BLK 145 and NL_LOG 165, 175, and 185. Recent updates made to metadata disk blocks, such as disk block images 133, 135, and 137, will have a structure, such as NL_BLK 145 associated with the updated disk block image that records, at a byte level, the changes made to the respective metadata disk block image, sometimes referred to as a metadata buffer, or in-memory buffer. For example, disk block image 133 is loaded into metadata cache 115, and buffer structure 123 tracks updates made to disk block image 133 by a transaction. The data structure NL_BLK 145 is associated (correspondingly connected) to buffer structure 123 and records the bytes of disk block image 133 that have been changed. Each mounted file system will have a corresponding NL_LOG data structure, which is the anchor for all information related to the log file on the disk for the file system. The term "anchor" refers to identifying a memory location from which a linked list extends, such as all the updated metadata for one or more disk block images for a file log of a particular mounted file system. NL_LOG 165 corresponds to file system 160, NL_LOG 175 corresponds to file system 170, and LN_LOG 185 corresponds to file system 180. Metadata update information contained within NL_LOG 165, 175, and/or 185, are written to disk, under appropriate conditions of embodiments of the present invention.

File systems 160, 170, and 180 are physical memory storage devices, referred to as "disks", to which the updates to metadata blocks, tracked in NL_LOG 165, NL_LOG 175, and NL_LOG 185, respectively, are written to for non-volatile memory storage. The metadata block updates held in NL_LOG 165, NL_LOG 175, and NL_LOG 185, are written respectively to log files 167, 177, and 187. Log files 167, 177, and 187 are hidden files inside a file system and a disk of a memory storage device can hold one or more file systems. File systems 160, 170, and 180 are mounted to file system server 110, which makes file systems 160, 170, and 180 accessible through the file management system of file system server 110.

File system manager 190 is a program operating on file system server 110, and provides management services for multiple file systems. File system manager 190 performs multiple tasks which may include, but may not be limited to, mounting activity of file systems, support of transactional updates to files within the multiple file systems, creating and enforcing of access permissions, and enforcing storage and backup attributes.

Metadata log program 700 works in conjunction with file system manager 190, and performs metadata journaling of transaction updates to files, recording granular updates at byte range level, with buffering and transaction equivalence mechanisms to ensure a log file wraps at a low level of frequency. The granular recording of metadata changes includes fine grained locking, based on use of dual lists associated with each metadata disk block image. One list includes active transactions updating metadata records, the other list includes completed transaction update records, not yet written to disk. Updating a list is protected by the same lock that protects the metadata block, such that in most cases, two concurrent tasks updating different metadata blocks run entirely in parallel.

Additionally, a granular recording will also note a deletion of a block by a transaction or the new allocation of a metadata block by a transaction. Noting when a block has been deleted by a transaction is very powerful because queued byte range updates for that block can be discarded, greatly reducing bytes within a log. It's very common when removing many files for example, that directory pages become empty, in which case the prior updates to that particular block may be discarded from memory due to the transaction equivalence mechanism only writing the finalized block-delete transaction. Indicating when a block is new is useful for recovery, because prior updates in the log can be ignored, and a disk read can be avoided. Yet another embodiment of the present invention, and a further aspect of granular recording, is the concept of near-adjacency.

The format of a log record for each log entry includes a header of approximately 20 bytes. Two or more byte ranges that are less than the size of a log record header can be coalesced into one record and still reduce the number of bytes written to the log. (For example, byte ranges 0, 3 and 6, 10 may be more effectively written as a single record of range 0, 10). Combining near-adjacent byte ranges also keeps the byte range lists much shorter, which reduces processor costs and search time. Embodiments of the present invention include combination of updated byte ranges that are separated by less than the byte range of a log record header, into a single updated byte range, and is referred to hereafter as near-adjacency, and is discussed further, below.

Included in some embodiments of the present invention is an active-delay mechanism; a type of transaction buffering. At the completion of a transaction, the resulting byte range updates are not immediately moved from an active transaction list to the completed list within a NL_BLK data structure, such as NL_BLK 145. Instead, the byte range is kept in an active state for a brief time, which may extend up to the synchronization interval of transaction updates, but can be externally controlled. In some embodiments of the present invention, the default time period in which the byte range is kept in an active transaction list is 30 seconds; however, the determination of the time period is also based on the number of records in the active transaction list (active state list). When a predetermined limit of records is reached, the byte ranges kept in an active transaction list are moved to the completed list, therefore the delay in moving byte ranges in an active list to a completed list has dependency of both time and the number of records in memory.

The byte range is kept in an active state for the brief time in case another transaction starts within that time period and performs updates on the same metadata. This is useful because subsequent transactions will frequently update the same metadata, and delaying the movement of active records to the completed list reduces the merging or re-updating records of previously completed transactions. One requirement of transaction buffering is that updates made by an active transaction to a byte range that is in the completed list, has to make a copy of the previous updates in that range (if not already done). This requirement emphasizes the benefits from the active-delay attribute of embodiments of the present invention. The brief delay in the active state allows overwriting of changes to the same byte range by a subsequent transaction, and is therefore less likely to require copying the previous updates that have been moved to a completed transaction state. The need to merge subsequent metadata transaction changes with completed metadata transaction changes is reduced, as is the need to make copies of previously updated byte ranges for records in the completed list.

In other embodiments of the present invention, an additional queue of buffers is employed, which is used in addition to an "oldest-first" traditional age queue. Embodiments of the present invention sort metadata buffers, by determining those that have not been recently updated, in an order that is based on the last page in the log file updated by the metadata buffer ("oldest-last" format). Sorting in this manner can be used to asynchronously schedule dirty metadata buffers to disk before the log file fills completely to avoid writing them when the log file becomes full. This reduces the time it takes to free the oldest log pages, which are good candidates for early scheduling to write to disk, freeing up space for the recording of new transaction data.

Figure 2:
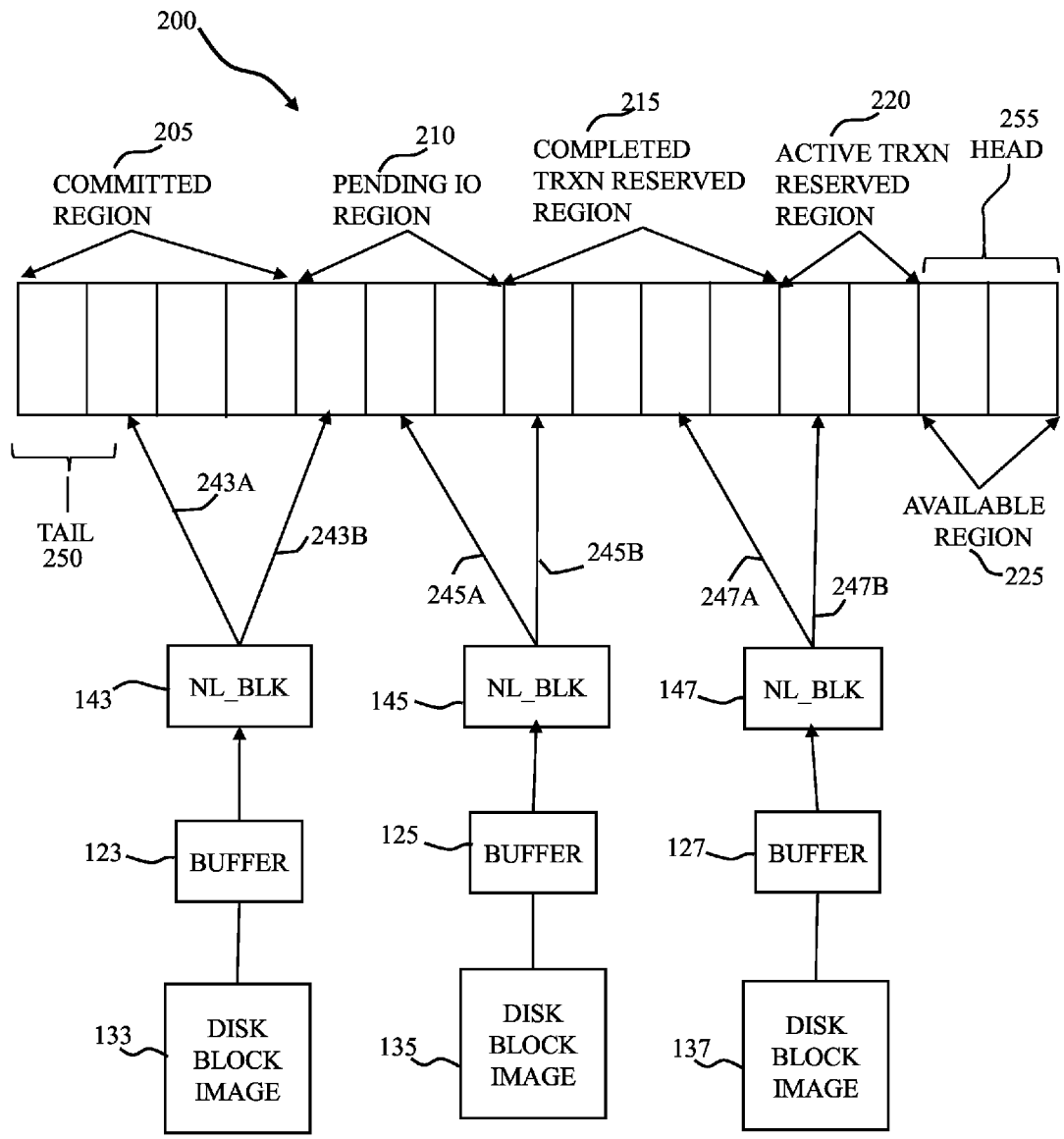
FIG. 2 is a functional block diagram depicting log file regions and scheduled writing indicators of metadata updates from metadata cache and log cache components, in accordance with an embodiment of the present invention.

FIG. 2 is a functional block diagram depicting log file regions 200, and scheduled writing indicators of metadata updates from metadata cache and log cache components, in accordance with an embodiment of the present invention. FIG. 2 includes committed region 205, pending IO region 210, completed transaction reserved region 215, active transaction reserved region 220, and available region 225, NL_BLK 143, 145, and 147, which correspond respectively to buffer structures 123, 125, and 127. FIG. 2 also includes in-memory metadata disk block 133, 135, and 137 that correspond respectively to buffer structures 123, 125, and 127. FIG. 2 also includes region status indicators 243A, 243B, 245A, 245B, 247A, and 247B.

The log file is a circular file that physically exists on disk, in which, in one embodiment of the present invention, each page is a 4K page that contains log records that describe physical updates (e.g. block number/offset/length) and the actual physical contents of that update for each update made as part of a transaction. From the point of view of the log cache, the log file has five distinct regions (not all of which need to exist at one time), which include committed region 205, pending IO region 210, completed transaction reserved region 215, active transaction reserved region 220, and available region 225.

Committed region 205 has the records of transactions previously run, completed and written to disk, and transactions associated with committed region 205 records are considered committed (they will be pushed forward during recovery). Pending IO region 210 includes reserved storage for log pages of transaction records that have been scheduled to be written to disk asynchronously. The transaction record pages of pending IO region 210 are considered complete transactions but not committed, because the log pages are not yet written to disk, but they will be soon, based on the time it takes for the log file IO, which is typically a few milliseconds at most. Completed transaction reserved region 215 of the log file has been reserved for records of completed transactions. The log pages have not been scheduled from memory to disk yet, but the space has been reserved based on determining available space in the log file prior to initiating a transaction, guaranteeing those records can be written to the log file. Active transaction reserved region 220 includes reserved log pages for actively running transactions. When a task to be executed by a file system management program, such as file system manager 190, prepares to start a transaction, a function call is made to the log manager to provide an estimate of how much space will be required in the log file to hold the records that will be created as part of the anticipated transaction (over-estimation is acceptable, but not under-estimation). In response to the metadata active transactions completing, and after a brief period of active-delay, the metadata updates will be included in the scheduling of completed transaction reserved region 215. Available region 225 has not been reserved for transactions and is not yet-in-use, but available for subsequent transactions.

Metadata updates resulting from transactions are said to be: committed (e.g. all committed records are written to disk), complete (e.g. all records are recorded but not yet safely written to disk), or active which means one or more tasks are actively generating changes to metadata and adding records to that transaction. The head of the circular log file, head 255, is the most recent region, towards available region 225, and the tail of the circular log file, tail 250, is the oldest region and includes committed transaction data, if any.

Region status indicators 243A, 243B, 245A, 245B, 247A, and 247B are exemplary representations of schedule status for transaction metadata updates in relation to log file regions described above. Indicator 243A shows that metadata updates of a transaction tracked in NL_BLK 143, received from buffer structure 123 that tracks updates made to disk block image 133, is committed and written to disk, and is one of the oldest records of the log file. Also NL_BLK 143 and 145 track metadata updates associated with indicators 243B and 245A, respectively, showing scheduled status of metadata updates awaiting an IO operation. Indicators 245B and 247A show that the scheduled status of metadata updates of NL_BLK 145 and 147 respectively, are directed to completed transaction reserved region 215. Indicator 245A shows that metadata updates of a transaction tracked by NL_BLK 145 has a schedule status associated with pending IO region 210. NL_BLK 145 tracks metadata updates received from buffer structure 125, which corresponds to metadata of disk block image 135 to which a transaction makes changes. Indicator 247B shows that metadata updates tracked by NL_BLK 147 have a schedule status directed to active transaction reserved region 220, indicating that the transaction is still active and buffer 127 continues to receive metadata updates made to disk block image 137, resulting from the transaction.

Some embodiments of the present invention use a new-value logging scheme, and as such a metadata buffer cannot be written to disk if it has been updated by actively running transactions. The writing of the metadata buffer is preceded by the current active transaction ending, and writing of the completed transaction updates to the metadata to the log file on disk. The metadata buffer cannot be written to disk until all update records associated with transactions that updated the metadata buffer are safely written to disk. In embodiments of the present invention, if a metadata buffer is to be written to disk, the completed transaction records stored in memory is first written to the log file on disk. Similarly, if the update records were scheduled to disk but the IO is not yet complete (pending IO region 210), then completion of the pending log IO activity needs to occur, with the metadata update records written to the log file, before writing the updated metadata block to disk. Thus, some embodiments of the present invention adhere to the practice that no metadata buffer is written to disk until all log records that describe updates to the metadata buffer are safely written to the log file on disk.

It is further pointed out that the log file has a finite length and will eventually wrap as more metadata update records are written to the log file, and in some embodiments of the present invention, before the oldest area of the log file can be over-written the oldest metadata buffers, corresponding to in-memory disk block images, are scheduled to be written to disk. To identify the oldest metadata buffers to write to disk, an age queue is maintained in memory that has the buffers sorted by the oldest log page for which there are update records. The age queue is scanned from oldest to newest writing out buffers to make the oldest log pages available for overwrite.

Sets of updates to metadata blocks are grouped by transaction. Tasks that need to update the metadata of a file system will call the log cache to start a transaction providing an estimate of the size of the transaction. If the log file can accept new transactions (the log file is not full), then the transaction is started and assigned an eight byte transaction identifier. Two tasks that update metadata for the same file system concurrently are automatically grouped into one transaction (hereafter referred to as the active transaction) and both receive the same identifier.

The log file format is now discussed. The primary role of the log cache is to take the collection of changes made to the various metadata buffers for each file system and write those changes to a hidden log file contained inside the file system as stored on disk. The log file is conceptually an array of 4K physical pages numbered from 0 to N−1. The physical location of the log file pages need not be contiguous on disk, but they often are to reduce seek time when writing. Each page has a small header and is composed of one or more records. A page does not need to be completely filled, there may (and often is) unused bytes at the end of the page. The header lists the offset of the last filled-in record on the page, and each record provides the offset in the page to the previous record. Thus records can be scanned forward from the page header, or can be scanned backwards. For explanation and further discussion of log file components and formats, exemplary labels (in italics) are presented for log page fields, log page header, and log page records, Each record is variable in size and contains two parts: logRecHdr—which is the common portion of every log record, it provides an eight byte transaction Id and the physical page number being updated by this transaction record and other information; NewData—which is the new contents for the region of the metadata page, this is optional, not all log records have a new-data part.

The log page header (NL_LPAGEHDR) has the following defined fields: lastLogRecOff, which is a 2-byte offset pointing to the last complete record in this log page; nextLogRecOff, which is a 2 byte offset to pointing to the next page location at which to store a new record; pageNumber, which is a 4 byte logical page number of this log page, this is the number of the 4K page with the first page counted as 0; pageFormatID, which is an indicator of the version of the log file page which is used in association with the particular layout of a page, should it receive changes in the future; passNumber, which is an 8 byte pass number that increments a pass number in memory for the aggregate each time the circular log file wraps, and assigns the pass number to the log page header when writing the log page. The pass number is the wrap count, and is used by log file recovery for determining the location of the head of the log file, which is the last log page written; mountTime, which is the time the file system was mounted, and is used during recovery to determine the validity of a page. Page 0 will have the mount time of the file system and every page in the log should have that same mount time, otherwise the page is not valid to use during recovery; restart, which is a flag byte, will have the value 1 if this is a restart record (the log was shut down cleanly for this file system) or 0 otherwise. Only valid for page 0 of the log file.

Each log record includes two parts. The first part, NL_LRECHDR, in this example, is a required part of all log records and contains the following fields:

recFlags—Type of log record, one byte, can be one of the following:
  NL_NEWDATA (0x01) contains new data updates to a metadata block.
  NL_NUBR (0x04) indicates the listed blocks (which follow the log record header) that were newly allocated to user files as part of this transaction and therefore do not use older log records in the log to modify these blocks if log recovery is performed (or user file contents get corrupted).
  NL_ENDTRAN (0x08) indicates the completion of a transaction. This means that records prior to this record in this log are valid for recovery.
  NL_FILL (0x10) indicates that this record is a fill record (a memset basically) of a given region of a metadata buffer. No new-data portion of the record exists, only the fill byte is recorded for this record and it's saved in the fill field in this header.
  NL_KILL (0x20) indicates the metadata block was freed as part of this transaction. If the end-transaction record is also present in the log file for this transaction then that means records in the log prior to this record need not be replayed for this block (the block de-allocate is being committed forward) and if no records for this metadata block follow this one in the log then a disk IO is saved in log file recovery.
  NL_ENCRYPT (0x40) will indicate that the transaction records are for a disk block that is stored in encrypted format.
fill—a one-byte field that is the fill byte, if the log record is an NL_FILL type; otherwise its contents are undefined.
priorOff—a two byte field containing the offset to the prior log record in the current log page (acts as a previous entry pointer).
tranId—an eight byte transaction identifier that is assigned to the transaction.
dataAddr—a four byte disk block number identifying the block that is being modified.
dataOffset—a two byte offset into the block that is being modified.
dataLength—a two byte length of data being modified by the current record. For
NL_NUBR records this is the total number of bytes that contain disk block numbers (four bytes per block number). Example: dataLength=16 means there would be 4 block numbers following this record if "recFlags" indicated this was an NL_NUBR record.

The second part of the log record is optional and includes the new data for the disk block being updated for NL_NEWDATA. For NL_NUBR records it's the list of blocks newly allocated by the transaction. It's not used for other types of log records.

Figure 3:
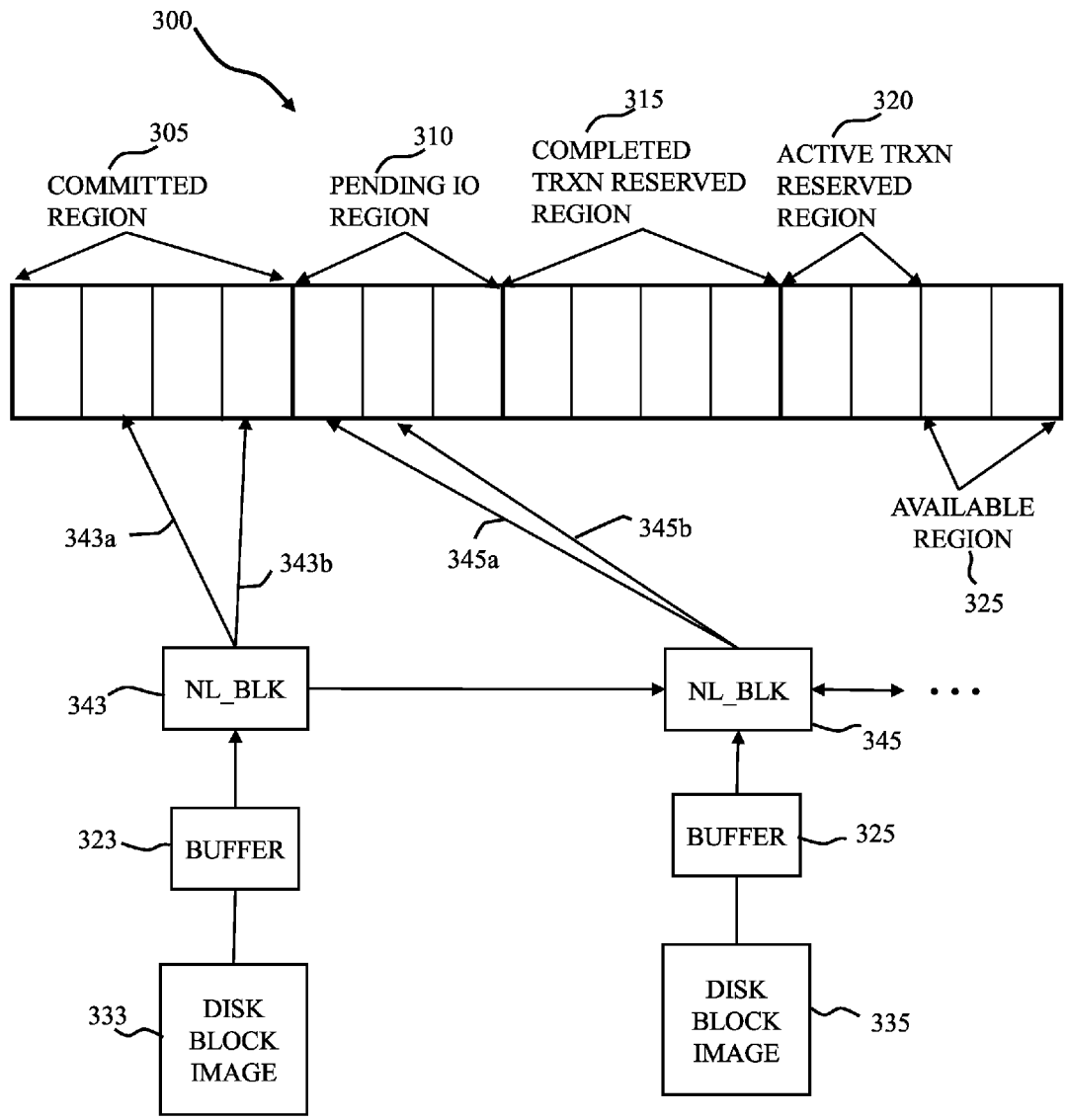
FIG. 3 is a functional block diagram depicting oldest-last queue, and schedule writing indicators of metadata updates from metadata cache and log cache components, in accordance with an embodiment of the present invention.

FIG. 3 is a functional block diagram depicting oldest-last queue 300, and schedule writing indicators of metadata updates from metadata cache and log cache components, in accordance with an embodiment of the present invention. Oldest-last queue 300 is based on the metadata update records of the circular log file, similar to that depicted in FIG. 2, with the exception of how records are ordered in the queue, and that only buffers (NL_BLKs) whose update records have been scheduled to disk are in the oldest-last queue, which is unlike the (oldest-first) age queue, which includes all NL_BLK buffers. Oldest-last queue 300 includes committed region 305, pending IO region 310, completed transaction reserved region 315, active transaction reserved region 320, and available region 325, described above with respect to FIG. 2. Oldest-last queue 300 also includes structures NL_BLK 343 and 345, which include updates from corresponding buffers 323 and 325, for metadata updates made to disk block images 333 and 335, respectively. NL_BLK 343 and 345 structures are shown (and other NL_BLK structures may also be included, but not shown) because there are no active transactions updating their corresponding metadata disk block images, and the metadata updates made to metadata disk block images 333 and 335 are in committed region 305 or pending IO region 310 of the log file. Indicators 343*a*, and 343*b* illustrate the metadata updates of NL_BLK 343 in committed region 305, and indicators 345*a* and 345*b* illustrate the metadata updates of NL_BLK 345 in pending IO region 310.

The information provided by the oldest-last queue identifies the blocks that are most worthy of scheduling to disk when the log is approaching full capacity. Thus, blocks that have update records that have not been written to disk should not be in this queue. Also, by ordering the list so that the list is ordered by the last log page updated, buffers that have not been updated in a "long" time may be scheduled to be written to disk as the log becomes full. Thus in-core (in-memory) images of metadata disk blocks are added to the queue when their metadata update records have been written to disk, and only if the metadata disk block images do not have update records for active transactions in progress, or active, at that time. An NL_BLK is removed from the list in response to an active transaction attempts to update the in-memory metadata disk block image that the NL_BLK represents, or when the metadata block represented by the NL_BLK is actually written to disk.

The oldest-last queue provides a technique by which old metadata blocks that are prioritized for scheduling to disk are quickly identified. Transactions of metadata updates have a locality and subsequent metadata transactions often update the same blocks most recently updated. The oldest-last queue tracks the blocks that have not been updated for a relatively "long" time, and as the log file approaches capacity, the dirty metadata buffers that have not been updated recently and for which no active transactions are performing changes to the metadata block are ideal for scheduling as an asynchronous write to disk. If some metadata disk blocks, that were not updated recently before the log file becomes full, for example, the log file being 75% full, are identified and asynchronously scheduled to be written to disk, then the number of blocks that need to be written when the log file is full can be reduced, as well as reducing the I/O wait time of a full complement of metadata disk blocks, corresponding to a full log file of update records, are written to disk. In practice, what is often seen is that some metadata blocks are continually updated, and would thus never be in the oldest-last queue, and some metadata blocks are hot for a while (receiving continual update) and then go cold (receive no recent update activity). The metadata disk block buffers that go cold that are identified in the oldest-last queue, and if they remain cold even as the log is filling, then there is benefit in asynchronously scheduling the metadata disk blocks to be written to disk. The "oldest-first" age queue is not ideal for such determination, because the NL_BLK corresponding to every metadata disk block image and their corresponding record updates are included, many of which are not able to be scheduled to disk because update records for it are still on disk, and the best candidate metadata disk blocks to schedule for writing to disk are ones whose last update is earlier in the log file as there is a lower probability of the blocks being updated again.

Figure 4:
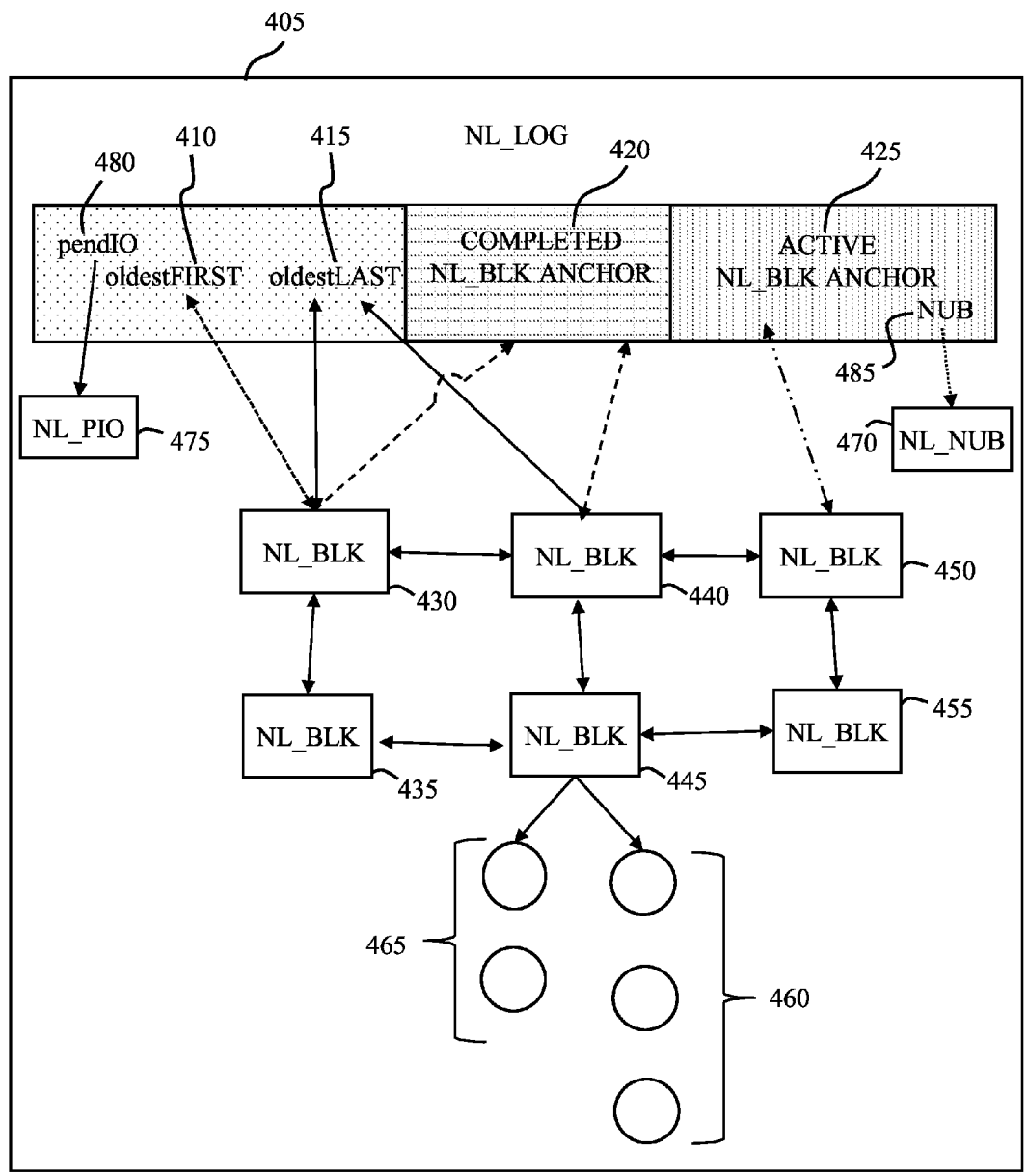
FIG. 4 is a block diagram illustrating an example summary of memory data structures of NL_LOG, supporting a log file for a particular file system, in accordance with an embodiment of the present invention.

FIG. 4 is a block diagram illustrating an example summary of memory data structures of NL_LOG 405, supporting a log file for a particular file system, in accordance with an embodiment of the present invention. NL_LOG 405 includes oldest-first list 410, oldest-last list 415, completed NL_BLK anchor 420, active NL_BLK anchor 425, NL_BLK structures 430, 435, 440, 445, 450, and 455, active transaction list 465, completed transaction list 460, NL_NUB structure 470, and NL_PIO structure 475. An NL_BLK structure, such as NL_BLK 430 may have metadata update records in multiple lists, depicted by the different dashed lines extending from NL_BLK 430, 440, and 450.

NL_LOG 405 is the main structure that anchors multiple aspects of metadata disk block updates of transactions, which include, but are not limited to: metadata update records, schedule status of metadata update records of transaction, age queue lists, log pages and records within log pages. NL_LOG 405 includes memory pointers, or "anchors" to blocks that have been updated by completed transactions (but not written yet to the log file) and blocks that are updated by actively running transactions. All metadata buffers that have had some update of some sort and have not been written to disk have a corresponding NL_BLK structure to track the progress of metadata update records. NL_BLK 450 is shown as pointing to ACTIVE NL_BLK ANCHOR 425, which is the memory location corresponding to the list of metadata block updates for active transaction metadata records, and NL_BLK 440 is shown as pointing to COMPLETED NL_BLK ANCHOR 420, which is the memory location corresponding to the list of updates for completed transaction metadata record updates made to the metadata buffer (not shown) associated with NL_BLK 440 that have not yet been written in the log file on disk. For clarity and simplicity of illustration, NL_BLK 450 is shown as having a connection to ACTIVE NL_BLK ANCHOR 425, whereas ACTIVE NL_BLK ANCHOR 425 may include anchors for each NL_BLK structure corresponding to metadata disk blocks that have active transactions. Similarly, COMPLETED NL_BLK ANCHOR 420 is depicted as having a connection to NL_BLK 440, whereas anchors for each NL_BLK structure, of NL_BLK 430, 435, 445, 450, and 455, having completed transactions, not yet written to disk, may have anchors to the complete metadata update records in COMPLETED NL_BLK ANCHOR 420. For illustration purposes, completed transaction list 460 and active transaction list 465 are shown associated with NL_BLK 445 structure.

Metadata update records of NL_BLK structures 430, 435, 440, 445, 450 and 455 are also chained in two age queues. One age queue, oldest-first 410 is oriented with the oldest (least recent) log page first, to the most recent log page last, which is the age queue previously described above. Some embodiments of the present invention include another age queue, depicted by oldest-last 415, in which the update records are a queue that has metadata buffers sorted by the last (most recent) log page containing records that describe updates to that particular metadata buffer. The oldest-last queue is used to determine cases in which a metadata block has not had a recent update. If the log is becoming full and a block has not had a recent update, this queue can be used to asynchronously schedule metadata blocks because they are less likely to receive immediate updates and the metadata blocks of the oldest-last queue will eventually have to be written to free up older pinned log pages. Each NL_BLK structure includes counters (not shown) that track how many bytes will be occupied in the log file by the relevant update records anchored in that structure.

A descriptive summary of the structures is provided:

NL_LOG 405 is the main structure used to represent the information related to a log file of a file system. One such structure is associated with each read-write mounted file system. This structure contains the estimated number of log pages that would be consumed by the current active transaction, keeps track of the next page(s) to write in the log, and has the anchor structures for the active transaction records and completed transaction records. It also has the anchors for the pending IO blocks and age queue as shown above.

NL_BLK ANCHOR 420 and 425 are stored inside the NL_LOG structure. They anchor the metadata blocks updated by active and completed transactions and the associated update records respectively and track how many bytes in the log file would be consumed to store those records. They also anchor lists of newly allocated blocks (NUB) for user files.

NL_UPDATE (not shown), is a structure used to record a metadata update, it contains the offset into the metadata buffer and length of the update being made and backward/forward pointers since its kept in a doubly-linked list.

NL_BLK 430, 435, 440, 445, 450, and 455, are structures that are anchored (memory location pointed to) to the buffer structure, which includes an in-core image of a disk block that contains metadata that have received transaction updates that have not been written to disk. The NL_BLK structures have threads for the various lists (e.g. age queues, active and completed transactions) and anchors lists of active transaction update records and completed transaction update records, for its corresponding disk block of metadata, which has not yet been written to the log file on disk.

NL_NUB 470 is a structure that includes a list element NUB 485, anchored in ACTIVE NL_BLK ANCHOR 420. The list element identifies disk blocks that were newly allocated as part of the transaction, which provides important information in the log file that prevents replay of metadata disk block updates that occur prior in the log to the records for the transaction that allocated the disk blocks. The information within NL_NUB 470 prevents corruptions of user files.

NL_PIO 475 is a data structure that represents pending log files in pending IO 480, which contains vectors of memory buffers used to transfer to the log file, and tracks the pass number and log page number of the portion of the log file being written. These structures are deleted when the log file IO completes.

Figure 5:
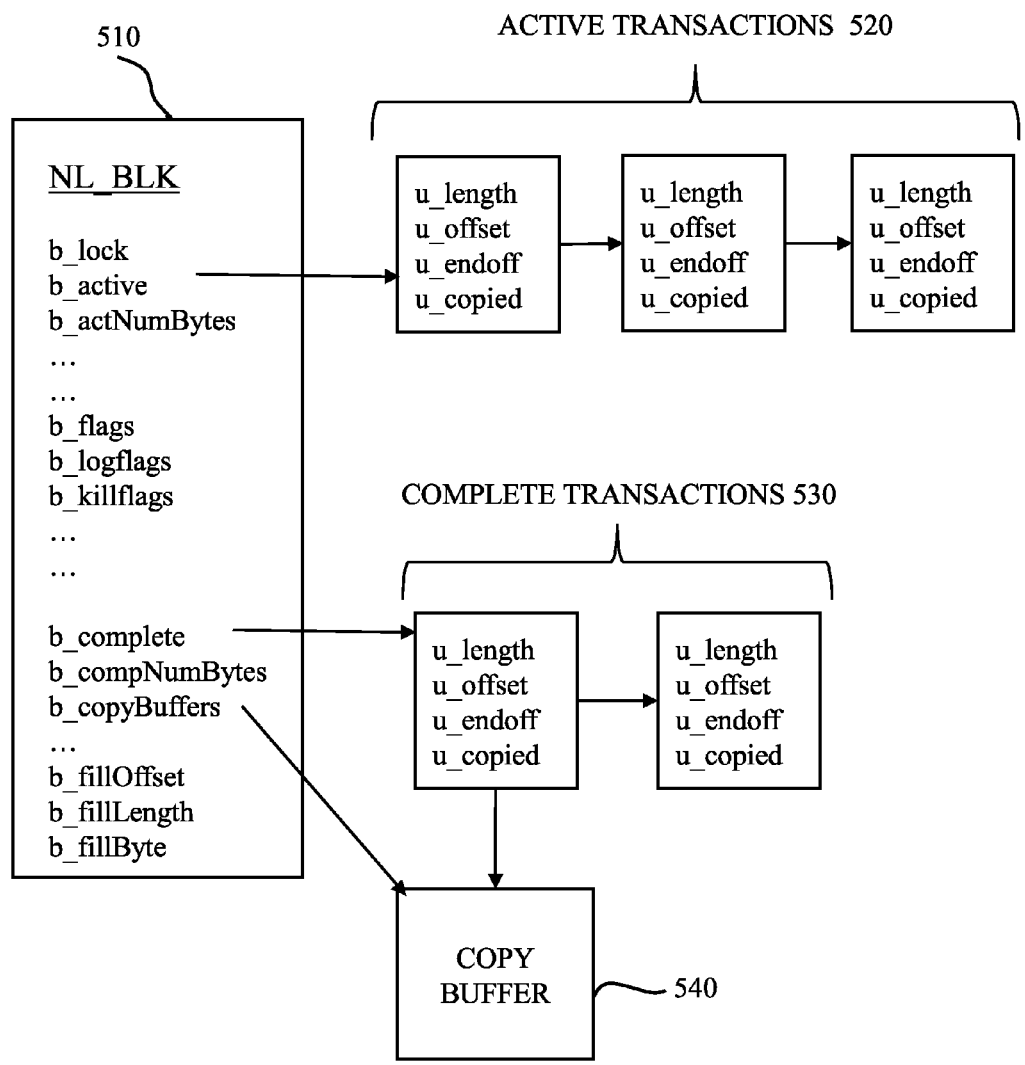
FIG. 5 is a block diagram showing details of an NL_BLK and its list of tracked buffers updates, in accordance with and embodiment of the present invention

FIG. 5 is a block diagram showing details of an NL_BLK and its list of tracked buffers updates, in accordance with and embodiment of the present invention. Embodiments of the present invention include tracking techniques described in the following discussion.

Updates to a metadata disk block are tracked via ordered lists which track the offset, length and end-offset of the update to the buffer (e.g. metadata disk block tracking variables: u_offset, u_length, and u_endof, respectively). The ordered lists are anchored in a software structure, which is held in memory, such as NL_BLK 510 held in the system memory of file system server 110. NL_BLK 510 includes multiple tracking fields that include b_active and b_actNumBytes, which may be used to track the updated ranges, and total number of updated bytes for updates made by active transactions 520. The tracking fields: b_complete and b_compNumBytes, anchor the updates made to the buffer by completed transactions 430 and the total bytes modified in the block by completed transactions 530. The log cache component may decide to transmit the update records of completed transactions 530 to disk (active transactions 520 cannot be transmitted to disk until the transactions that made those updates have ended), and because of this, a copy of the relevant bytes of the record updates of completed transactions 530, which has an overlap with update records of active transactions 520 are copied so that the state of the disk block byte range at the time of the completed transaction update is preserved. The u_copied field is used to denote when a copy of the range of bytes described by a completed update record was made to copy buffer 540 to avoid repeated copies to copy buffer 540 (once copying is done for a byte range, it need not be done again due to future active updates to the byte range). The tracking fields, b_fillOffset, b_fillLength and b_fillByte are used to track cases where a large region of the buffer is simply being set or cleared to reduce the need for an update record. There are three flag fields (three because they are protected by different locks, described subsequently) that track additional information related to updates made to the disk block (additional information fields not shown):

b_flags contain the following bit definitions:
  B_INACT—indicates that the NL_BLK is in the list of blocks updated by the active transaction.
  B_INCOM—indicates that the NL_BLK is in the list of blocks updated by completed transactions.
  B_NEWBLK—indicates if the block is newly allocated as part of the active or complete transaction.
  B_KILL—iIndicates the block was deleted as part of a completed transaction.
  B_FILLACT—indicates that the fill fields, b_fillOffset, b_fillLength, b_fillByte, are set for the active transaction.
  B_FILLCOM—indicates that the fill fields are set for completed transactions.
b_logflags are used to indicate presence in one of the queues of buffers:
  B_INOFIRST—indicates that the buffer is in the age queue of buffers sorted by first update made to the log file
  B_INOLAST—indicates that the buffer is in the queue of buffers sorted by last update made to the log file used to allow for early scheduling of buffers.
b_killflags can be set to indicate that the active transaction has freed the metadata block as part of the transaction. When the active transaction moves to the completed transaction list, update records for this buffer can be discarded, significantly reducing the number of bytes needed to write to the log file.

Figure 6:
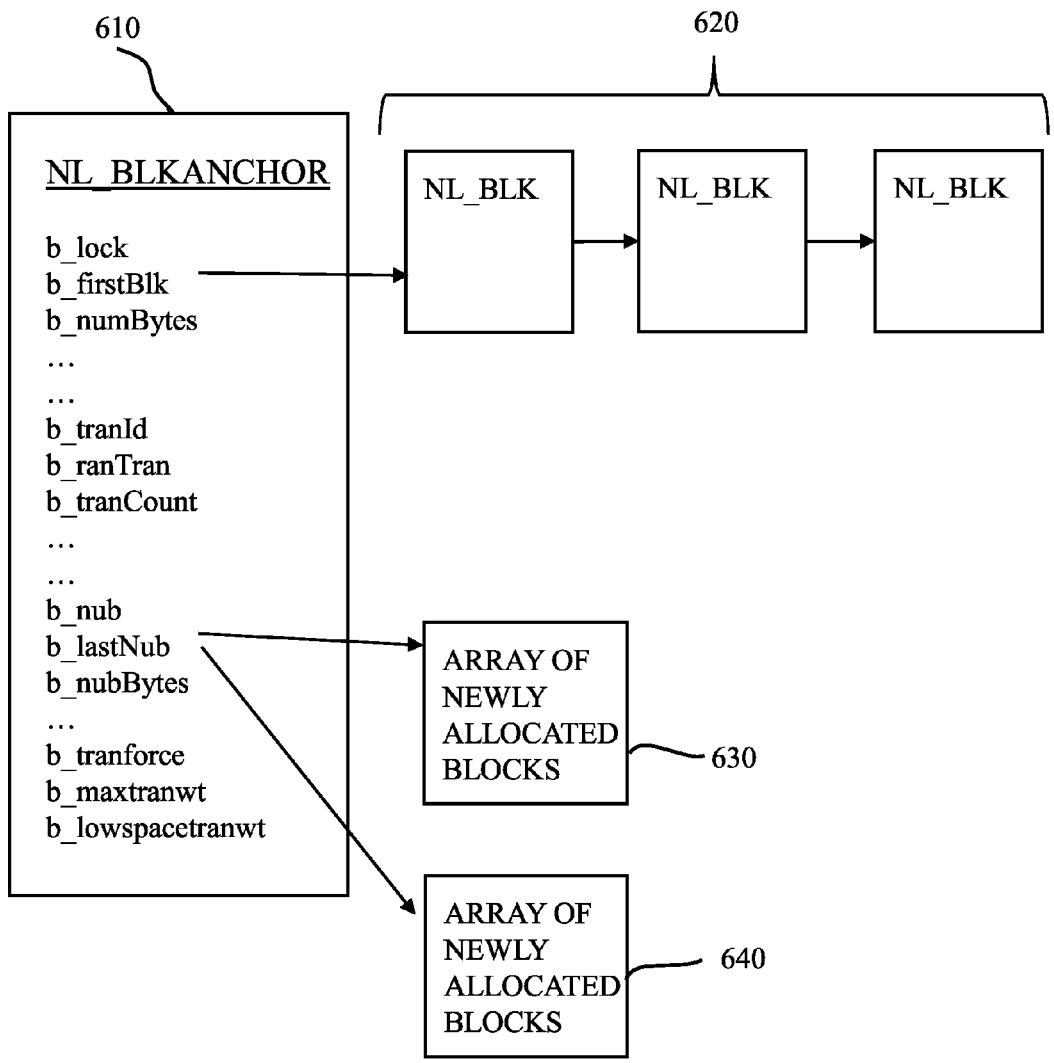
FIG. 6 is a block diagram that shows exemplary fields of the active and completed transaction lists of structure NL_BLKANCH, in accordance with an embodiment of the present invention.

FIG. 6 is a block diagram that shows exemplary fields of the active and completed transaction lists of structure NL_BLKANCHOR 610, in accordance with an embodiment of the present invention. The active and completed transaction lists are part of the NL_LOG structure details of tracked buffer updates of each NL_BLK of NL_BLK 620. In some embodiments of the present invention, there is one structure, such as NL_BLKANCHOR 610, for active transactions, and one such structure for completed transactions that have not yet been written to the log file (not shown). Each has a lock to protect their lists and fields, and the list of updated metadata blocks is anchored at a_firstBlk. Additionally, metadata blocks that are newly allocated to user files, such as newly allocated blocks 630 and 640 (and whose contents are no longer of interest to record, and are not be included in recovery, in embodiments in which recovery may be required), are kept in lists anchored at a_nub/a_lastNub.

In some embodiments of the present invention, the maximum number of entries in a single array is 16. If more than 16 user blocks are needed, then multiple arrays are used and kept in a simple linked list. To keep track of how many bytes will be consumed by the update records of all metadata blocks, the fields, a_numBytes and a_nubBytes are used. The field, a_numBytes tracks the total number of updated bytes made by all the updated records for all the metadata blocks associated with the transaction, including the bytes used for new user blocks, which is recorded separately in field, a_nubBytes. Flag fields, a_maxtranwt and a_lowspacetranwt are set when tasks are waiting to start a transaction, in which the waiting is due either to the maximum allowable transactions being already in progress, or the log is low on space. The a_tranforce flag is set if the log contents have to be forced to disk (for example, an fsync operation) which would involve delays for calls for new transaction starts. The a_tranId is the eight byte transaction identifier assigned to the transaction. The field, a_tranCount is the number of transactions batched into one transaction. If two or more concurrent tasks wish to update the same file system at the same time, their transactions are merged into one, active transaction, and the field, a_tranCount, keeps track of how many transactions have been batched into the active transaction that have not yet ended. The field, a_ranTran, is only used for completed transactions, and is a count of how many transactions have completed. The field, a_ranTran, along with a_numBytes/a_nubBytes are used to determine when to move completed transaction records from memory to disk, and can be externally tailored to provide a balance between transaction buffering (performance) and rollback of data at crash time.

An exemplary listing of information fields of an NL_LOG structure, such as NL_LOG 165 of the log cache 140 (FIG. 1), is presented. The information fields shown for NL_LOG 165 include the active and completed transaction lists, oldest-first and oldest last queues, as well as other detailed information of metadata updates that are part of NL_LOG 165 structure, from the tracked buffer updates of the corresponding NL_BLK structures, such as NL_BLK 145. Some embodiments of the present invention make use of the following information fields associated with transaction updates to metadata disk block images in memory:

l_totalSize, is the field holding the number of pages in the log file on disk.
l_lock, is the field for the locking flag that protects the lists anchored in the NL_LOG and the NL_LOG fields
l_pioLock, is the field for the lock that protects the pending log IO (NL_PIO) list.
l_schedDistance, is the field holding the distance in 4K pages between the last completed page and the current active block (used to determine when to schedule log pages)
l_logReclaim, is the field holding the number of blocks to be reclaimed during log full processing. This determine how many log pages are to be unpinned when writing out dirty metadata to handle a log file full condition.
l_active/l_complete, is the field that includes the memory location pointers, or "anchors" of the two NL_BLK-ANCHOR structures for active and completed transactions, respectively.
l_nextID, is the field that holds the next transaction identifier to give to a new transaction.
l_lastCommittedTran, is the field holding the transaction identifier of the last committed transaction.
l_passNo/l_nextLogBlk, is the field holding the pass number to store in the next log page to write to disk and the next log page to write in the circular log.
l_pinnedSize, is the field holding the number of pages pinned in the log file by un-written dirty metadata blocks.
l_commitPassno/l_commitOffset, is the field holding the pass number/offset of committed transactions that are fully written to the log file.
l_ofirstHead/l_ofirstTail, are fields that include the anchors to the head and tail of the age queue of blocks.
l_olastHead/l_lastTail, are fields that include the anchors to the queue of oldest-last blocks.
l_pioHead/l_pioTail, are the fields that include the anchors to the list of pending log file IOs. Each log file IO is represented by an NL_PIO structure.
l_activeTranPages, is a field that holds the number of log pages estimated to accommodate updates of all actively running transactions.
l_mountTime, is a field holding the mount time of file system, stored in the header of each log page
l_actBlocks, is the field that holds the number of blocks that have been updated by active transactions.
l_blocksPerIO, is the field that holds the number of pages preferred for an IO. This determines how many bytes are buffered in memory before writing out completed transaction records and is configurable.
l_logFullProcessing, is a field that indicates if log full processing is underway, which means that the oldest dirty metadata blocks are being written to un-pin the oldest pages of the log file.
l_activeDelayUsed, is the field holding the number of page used by transactions that ended, but have not been moved to the list of completed transactions. Embodiments of the present invention use this field to determine if a completed transaction should be left in the active list or not. Embodiments of the present invention that delay the movement of completed transactions from the active list to the completed list, reduce the use of copy-buffers as described in FIG. 4.

Metadata updates in the state "pending IO to the log file" are represented anchors in pending IO data structures pointing to the in-memory pages that are in transit to the log file disk and IO structure information, for example, NL_PIO 475 receiving memory anchors from pending IO 480 (FIG. 4). Embodiments of the present invention make use of the following information fields of pending IO data structures, such as NL_PIO 475:

p_tranId, is a field holding the identification of the transaction whose records are being written to the log file.
p_waiter, is a field that indicates if there is a task waiting for the IO to complete (because the task wants to ensure all records for a completed transaction are in the log file, which means the transaction has committed).
p_passno, is a field that includes the pass number of last log page written by this IO.
p_offset, is a field holding the offset into the log file of the last page written by this IO.

The following locks are used to protect the various in-memory structures related to a specific log file:

NL_BLKANCHOR.a_lock—This lock protects the fields in the NL_BLOCKANCHOR structure and lists that are anchored in this structure (such as the list of blocks with pending updates). Since there are two of these in the NL_LOG (one for active transactions and one for completed transactions) there are two of these locks.

NL_LOG.l_lock—This lock protects the head pointers/pass number fields inside the NL_LOG structure and is used to protect the age queues.

NL_LOG.l_piolock—This lock protects the list of pending IO blocks (NL_PIO) anchored in this structure and also protects the commit pass number/block number and last committed transaction identifiers stored in the NL_LOG structure.

Buffer.lock—The main lock of the buffer structure is used to protect updates to the buffer or the NL_BLK structure (such as manipulation of the list of update records for the block).

To avoid deadlocks, lock ordering is used. Tasks that use more than one lock at a time obtain locks in the following order: 1) NL_LOG.l_block; 2) NL_LOG.l_active.a_lock—(this is the active transaction block anchor lock); 3) NL_LOG.l_complete.a_lock—(this is the completed transaction block anchor lock) 4) NL_LOG.l_lock. All other locks are obtained last. Those locks are only held for short updates and paths that obtain those locks do not obtain other locks.

Figure 7:
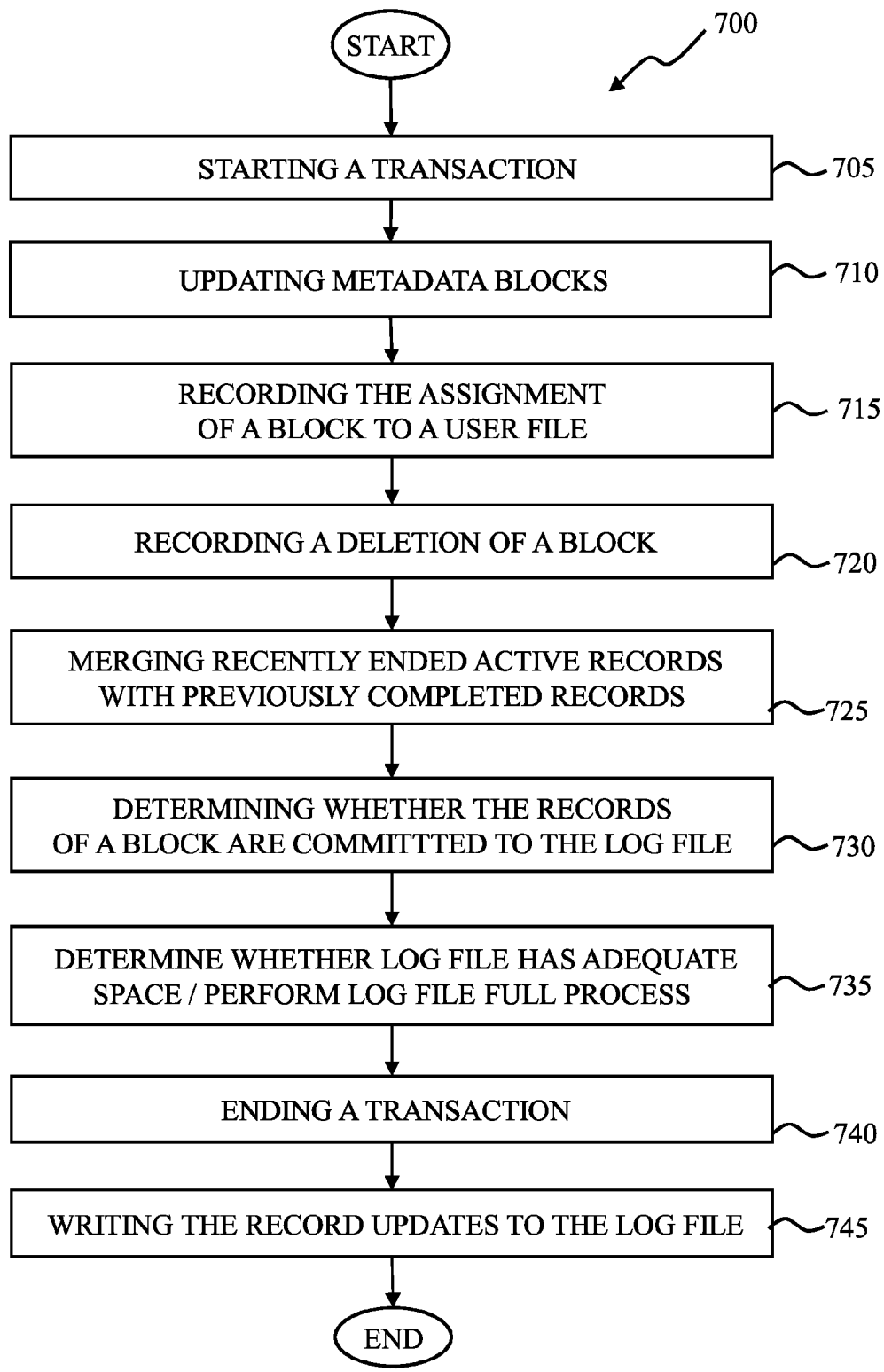
FIG. 7 illustrates a flowchart of the operational steps of a metadata log program, in accordance with embodiments of the present invention.

FIG. 7 illustrates a flowchart of the operational steps of metadata log program 700, in accordance with embodiments of the present invention. In some embodiments, metadata log program 700 is comprised of modules that perform a group of activities, and each module corresponds to a step of the flowchart. In addition to a description of each flowchart step, an exemplary set of pseudo-code is presented to provide details of the activities of each module.

In step 705 metadata log program 700 performs the activities of starting a transaction. Subsequent to mounting of a file system that is mounted in a read-write (RW) mode, tasks making write calls to the file system will be in condition to start transactions. An input to the transaction-start module is the size of the transaction (tranSize), which would be input as the largest expected size of updates to be written to the file log, given the transaction type. For example, a transaction that simply updates a file modification time would have a very small transaction size, and a transaction that was truncating content of a large file may be much larger. In some embodiments of the present invention, large transaction operations are divided into multiple smaller transactions so that the information to be recorded for a single transaction can be accommodated within the log file. For a transaction to start, the available space in the log file is checked, such that the estimated bytes that the transaction consumes fits within the available space. If available space is low, then older, dirty metadata blocks may that have not been updated recently and have active transactions, may be written to disk to free up space. An output of starting the transaction is generation of a transaction identifier (tranId) which can be recalled if synchronization of the transaction is required later, or to recall the last transaction that updated a metadata object.

The transaction start follows a flow that includes determining if the NL_LOG is full, or if the expected size of the transaction to be recorded can be accommodated in the available pages of the NL_LOG. If the NL_LOG is full, or if the expected size of the transaction metadata exceeds available pages in NL_LOG, the transaction waits until adequate log space is freed (deleted or written to disk). Pages that are delayed after transactions have technically ended, but are left in the active list, are identified so that updates made to the same byte ranges by other transaction tasks replace previous changes, and reduce log file and metadata writes to disk. The delayed pages remain in the NL_LOG along with completed and active transaction pages, and the remaining log space is determined. The transaction start reinitiates when NL_LOG space is cleared, and locks are released.

If the estimated transaction size will not fit into the available log file space, metadata log program 700 determines if there are actively running transaction, and if none are determined, metadata log program 700 checks to determine if there are active-delayed transaction. If there are active-delayed transactions, which are technically complete, they are merged with the list of completed transactions that have not yet been written to disk. This frees up space in the NL_Log file, and metadata log program 700 returns to the transaction start and checks for adequate NL_Log space, and continues.

If there are no active-delayed transaction, metadata log program 700 performs log full processing (described in detail below), and clears flags indicating waiting transactions, due to low NL_Log space, and wakes up the transactions waiting due to low space, and proceeds with transaction start. In the case in which there are actively running transactions, low space flags are set for transactions waiting to run and the transactions wait (sleep) until woken up because NL Log space has become available, and metadata log program 700 proceeds with a transaction start.

Waiting transaction tasks can start once adequate NL_Log space is available, and new tasks will share the transaction of active transactions that are running. Transaction counts are incremented as well as identifying actively running transactions, and the transaction size is added to current size of NL_Log along with the transaction ID of newly started transactions. Embodiments of the present invention identify the actively running transactions to facilitate the active-delay feature, which reduces writes to disk by including metadata updates to the same byte ranges in NL_Log made by subsequent transactions.

Metadata log program 700 increments to the next transaction, setting the transaction ID, setting the transaction as "active", and sets the header size of the active transaction in NL Log, and sets (increments) the active transaction count. Although not discussed in detail for clarity purposes, various locking modes are utilized to protect processing and status of the metadata associated with completing the transaction. The transaction start module includes the active-delay feature of embodiments of the present invention and when determining available NL_Log space, transactions that are logically completed, but not yet moved to the complete list (active delay) have to be figured in to determining the occupied space of NL_Log. The following is an example activity flow of the starting a transaction procedure:

1. If NL_LOG.l_logFullProcessing is set, then task waits.
2. Set numCompletedPages to the ceiling of NL_LOG.l_complete.a_numBytes expressed in pages.
3. Set activeUsedPages to the ceiling of NL_LOG.l_active.a_numBytes expressed in pages.
4. If numCompletedPages+activeUsedPages>NL_LOG.l_blocksPerIO then task waits.
5. Else if NL_LOG.l_active.a_tranForce is set then the task waits.
6. If the task waits then:
    a. Set NL_LOG.l_active.a_maxTranWt to 1
    b. Make task sleep until woken up, releasing held locks
    c. Go back and start over at step 1.
7. Set delay_pages=ceiling of NL_LOG.l_activeDelayUsed expressed in pages. This represents the number of log file pages that will be occupied by writing transaction records for transactions that have technically ended, but are left in the active list, enabling the active delay feature of embodiments of the present invention.

8. Set numActivePages=NL_LOG.l_totalSize−(NL_LOG.l_pinnedSize+numCompletedPages+delay_pages). This represents the amount of log space left over for new transactions.
9. Set maxActive=numActivePages−NL_LOG.l_activeTranPages. This represents the number of pages left over in the log after factoring in everything, including transactions actively in-progress and is the indicator of how much "space" is left in the log to reserve for this new transaction.
10. If maxActive<tranSize (transaction will not fit into the log file)
    a. If NL_LOG.l_active.a_tranCount=0 (no actively running transactions) then:
        i. If NL_LOG.l_active.a_ranTran>0 (there are active-delayed transactions) then:
            1. Merge active transaction records to the completed list. (This is described in its own section). Merging of transaction records often results in space savings and might result in enough space in the log to start the transaction. This is part of the active-delay mechanism of the invention.
            2. Release NL_LOG.l_lock and start over
        ii. Perform Log Full Processing (Also described in its own section)
        iii. If NL_LOG.l_active.a_lowSpaceTranWt is set, clear the flag and wake up tasks waiting on low space processing.
        iv. Release locks and retry from step 1.
    b. Set NL_LOG.l_active.a_lowSpaceTranWt to 1
    c. Release locks and sleep until woken up and then go back to step 1.
11. At this point the transaction can start. If NL_LOG.l_active.a_tranCount>0 (already active transactions running, this task will share that same transaction) then:
    a. Increment NL_LOG.l_active.a_tranCount and NL_LOG.l_active.a_ranTran
    b. Add tranSize to NL_LOG.l_activeTranPages
    c. Set tranId to NL_LOG.l_active.a_tranId
12. Else (no other concurrent active transactions for this log)
    a. Add tranSize to NL_LOG.l_activeTranPages
    b. If NL_LOG.l_active.a_ranTran>0 then:
        i. Increment NL_LOG.l_active.a_ranTran
        ii. Set tranId to NL_LOG.l_active.a_tranId (this is another piece of the active delay feature)
    c. Else
        i. Use a compare and swap operation (CS) to atomically increment the NL_LOG.l_nextId and set tranId to the new transaction identifier and also set NL_LOG.l_active.a_tranId to that same value.
        ii. Set NL_LOG.l_active.a_ranTran to 1
        iii. Set NL_LOG.l_active.a_numBytes to the size of the NL_LRECHDR described in the data structures section. The end-of-transaction record is reserved at this point (end transaction is represented in the log file by a singular NL_LRECHDR structure).
    d. Set NL_LOG.l_active.a_tranCount to 1 (this is the only active transaction)
13. Release held locks and return tranId.

Intentionally excluded from the algorithm above is the locking that is used, which is done for clarity. When starting a transaction, the active transaction lock (NL_LOG.l_active.a_lock) is held in write mode throughout the logic. If there are no difficult situations, such as performing merge processing, or log full processing, then the NL_LOG.l_lock is held in read mode in case another task is performing complicated processing. If merging of records or log full processing is to be performed, then the NL_LOG.l_lock is released in read mode and locked in write mode (since it protects the age queues), and additionally, the NL_LOG.l_complete.a_lock is held in write mode (since it protects the completed transaction lists). If a lock is not held in the proper mode, then locks need to be released and re-obtained in the correct mode and processing starts again from the beginning of the routine. The exemplary flow of starting a transaction includes the active-delay technique employed by embodiments of the present invention. The determination of free space available in the log file for transactions to be run factors in transactions that are logically completed, but not yet moved to the complete list (active delay).

In step 710, metadata log program 700 updates metadata blocks. When a metadata block is to be updated as a result of a task, a buffer structure address is passed to metadata log program 700, which is the control structure for the in-memory disk block, and which also points to the NL_LOG for the file system. Metadata log program 700 detects the in-memory disk block of metadata by receiving the passed buffer structure. The buffer structure address anchors the NL_BLK which records the byte ranges of the block that are updated. The transaction task initiation also includes passing an array of scatter-gather vectors which indicates which bytes are to change, and if the change is a straight forward assignment of a range of the buffer, the change may be indicated as a fill of a repeating byte pattern (only one vector entry is used in the implementation). A scatter-gather vector has three fields: offset into the buffer, length of the update at the offset and the address of new data to place in the buffer. Also, the transaction initiation will indicate if the designated metadata block is a newly allocated block so it can be recorded in the log. The output of the update of metadata blocks module is to ensure the buffer receives the desired metadata bytes; however, metadata log program 700 will internally mark the buffer dirty and record the metadata updates in the log cache component. On input, the buffer is locked in write mode so the task has exclusive access to it. The steps of metadata log program 700, described above and listed in an example algorithm below, include several aspects of embodiments of the present invention. Granular recording of metadata updates is described fully in steps 4 and 5. The use of copy buffers, and the overhead associated with them is presented in step 5d. Thus the value of the active-delay feature of the invention described in the transaction-start and Ending a Transaction sections, is shown since it minimizes the probability that step 5d is performed. Finally the ordered-last logic that updates the ordered-last queue and uses its information to determine if scheduling of not-recently-updated buffers is reasonable, is shown in steps 10 and 11.

The following is an exemplary algorithm for activity updating the metadata buffer:
1. If there is not an NL_BLK attached to the buffer: (first time update to buffer)
    a. Lock NL_LOG.l_active.a_lock in write mode
    b. Obtain storage for NL_BLK, clear it and anchor it in the buffer structure
    c. Add it to head of active list (NL_LOG.l_active.a_firstBlk)

d. Set B_INACT bit in NL_LOG.l_active.a_flags and also if the caller indicates it's a new block, set B_NEWBLK flag too.
2. Else if the B_INACT bit not set, then:
   a. Lock NL_LOG.l_active.a_lock in write mode
   b. Lock NL_BLK.b_flagLock in write mode
   c. Set the B_INACT flag bit
   d. Release NL_BLK.b_flagLock
3. Release NL_LOG.l_active.a_lock if obtained in step 1 or 2.
4. If this is a fill request (memset of a region of the buffer) then:
   a. Lock NL_LOG.l_active.a_lock in write mode
   b. Add the length of the fill (memset)+size of NL_L-RECHDR, rounded up to a word boundary (a boundary evenly divisible by four) to NL_LOG.l_active.a_numBytes
   c. Release NL_LOG.l_active.a_lock
   d. Set the B_FILLACT flag in NL_BLK.b_flags
   e. Set the b_fillByte, b_fillLength, b_fillOffset with the callers input in the NL_BLK structure
   f. Add the length of the fill record to NL_BLK.b_actNumBytes
5. Else loop processing the vector entries, each iteration of this loop processes on input scatter-gather vector entry:
   a. Obtain the NL_BLK.b_flagLock in write mode
   b. Scan the list of active update records anchored at NL_BLK.b_active. Note that since the caller often provides input vectors ordered by offset in the buffer, a simple improvement is used, such that the prior position in the list is used to start when processing subsequent vector entries. Handle the possible cases:
      i. No overlap with range in the vector and the byte range in existing NL_UPDATE record anchored in NL_BLK.b_active—this is the new record case, in this case the NL_UPDATE record to follow is known because the position was determined when scanning the list:
         1. Obtain a new NL_UPDATE record, and fill in the u_offset, u_endoff, u_length fields with the fields from the input scatter-gather record.
         2. Add to the list of records in the proper sorted position
         3. Release NL_BLK.b_flagLock
         4. Obtain NL_LOG.l_active.a_lock in write mode
         5. Compute dataLength=length of the update record+size of NL_LRECHDR rounded to word boundary
         6. Add dataLength to NL_LOG.l_active.a_numBytes
         7. Release NL_LOG.l_active.a_lock
         8. Add the dataLength of the update record to NL_BLK.b_actNumBytes
      ii. An existing NL_UPDATE record in the list completely overlaps the input scatter-gather vector entry, no adjustment of the list is needed in this case and this is a very common cast in practice.
      iii. The new scatter-gather vector entry partially overlaps, or wholly overlaps one or more existing NL_UPDATE records in the list. In this case what is performed is to:
         1. Obtain an NL_UPDATE record to contain the new record
         2. Determine the total length of this record by comparing subsequent records to determine if they are wholly or partially overlapped by this record.
         3. Determine the total adjustment (dataLength) of this new record and the ones it may be replacing, and the new offset/length of the record. This is accomplished by scanning the list to find the first records whose offset is greater than the offset+length of the input scatter-gather vector entry (or until the end of the list is reached). This new length may be greater or less than the original sum of the length of the records being replaced. For example, if one record overlaps three others, then only one record header would be written to the log for the new range.
         4. Obtain a new NL_UPDATE record, and fill in the u_offset, u_endoff u_length fields with the calculations made in step 3.
         5. Add to the list of records in the proper sorted position
         6. Remove from the list, and free NL_UPDATE records being replaced by the new record
         7. Release NL_BLK.b_flagLock
         8. Obtain NL_LOG.l_active.a_lock in write mode
         9. Add dataLength (may be a negative value) to NL_LOG.l_active.a_numBytes
         10. Release NL_LOG.l_active.a_lock
         11. Add the dataLength of the update record to NL_BLK.b_actNumBytes
   c. If the NL_BLK.b_flagLock is held in write mode at this point, release it.
   d. If this is not a fill call (a memset) and NL_BLK.b_complete is not NULL (there are update records for completed transactions for this buffer) then do:
      i. Lock NL_LOG.l_complete.a_lock in read mode
      ii. Scan the list of update records anchored in NL_BLK.b_complete:
         1. If a record is found that overlaps the input scatter-gather entry and the u_copied flag is NOT set (need to make a copy):
            a. Obtain a copy buffer if one has not already been obtained
            b. Copy the bytes from the buffer, for the byte range indicated by the NL_UPDATE record to the copy buffer.
            c. Set the u_copied flag in the NL_UPDATE record.
      iii. Release the NL_LOG.l_complete.a_lock
   e. Copy the input data from the callers' scatter-gather buffer, to the target in-memory buffer; now the in-memory buffer has the data desired by the caller.
6. If the B_INOFIRST flag bit is not set (buffer not in the aqe queue) then:
   a. Lock NL_LOG.l_lock in write mode
   b. Add to the head of the age queue anchored in NL_LOG.l_ofirsthead
   c. Increment NL_LOG.l_actBlocks by 1
   d. Set NL_BLK.b_logFirstPass/NL_BLK.b_logFirstOff from NL_LOG.l_passno/NL_LOG.l_nextLogBlk respectively (this is the first log page this block has update records for).
   e. Release the NL_LOG.l_lock
7. Lock the NL_BLK.b_flagLock in write mode
8. Update the NL_BLK.b_logLastPass/NL_BLK.b_logLastOff from NL_LOG.l_passno/NL_LOG.l_nextLogBlk respectively (this is the most recent log page this buffer has update records for)
9. Release the NL_BLK.b_flagLock
10. If the B_INOLAST flag is set then the buffer is removed from the queue sorted by last log page updated. The flag filters the queue, which is only used to remember buffers that have not had recent updates, obviously the input buffer has had recent updated:
   a. Lock the NL_LOG.l_lock in write mode
   b. Remove from the queue ordered by last log page updated (NL_LOG.l_olasthead/NL_LOG.l_olasttail)
   c. Clear the B_INOLAST flag bit
   d. Release the NL_LOG.l_lock
11. At this point the buffer is fully updated and the byte ranges updated in the buffer are properly adjusted and all other lists are adjusted. But because an ordered-last queue of records is maintained, which is used to track buffers that have not been recently updated, a check is made to determine if it's time to schedule not-recently-updated buffers. Thus if NL_LOG.l_olasthead is not NULL then:
   a. Compute ActivePages=ceiling of (NL_LOG.l_active.a_numBytes+NL_LOG.l_complete.a_numBytes) expressed in 4K page units
   b. Compute ActiveOff=NL_LOG.l_nextLogBlk+ActivePage
   c. If the computation in step 11b is larger than the log file size (NL_LOG.l_totalSize) (which means log file wraps):
      i. ActivePass=NL_LOG.l_passno+1
      ii. Subtract NL_LOG.l_totalSize from ActiveOff
   d. Else set ActivePass to NL_LOG.l_passno
   e. If ActivePass/ActiveOff–NL_BLK.b_logLastPass/NL_BLK.b_logLastOff (this is the distance in pages from the active region and the last update made by the oldest block in the ordered-last queue)>=NL_LOG.l_schedDistance AND the oldest block in the ordered last queue's last update has been written to disk (the transaction that last updated it has been committed, and this is easily determined by comparing the NL_BLK.b_logLastPass/b_logLastOff fields to the last committed pass/block as indicated by NL_LOG.l_commitPassno/l.commitOffset) THEN:
      i. Schedule the oldest buffers in the oldest-last queue. Scheduling buffers from a queue will be discussed later in Log Full Processing.

Embodiments of the present invention illustrate the granular recording of metadata updates in steps 5 and 6 of the exemplary algorithm presented above, as well as the use of copy buffers and their associated overhead, in step 5d. The value of the active-delay feature of the described in the starting a transaction and ending a transaction sections, is realized, because the probability of requiring step 5d is minimized. It is also noted in the above algorithm that the ordered-last logic that updates the ordered-last queue and uses its information to determine if scheduling not-recently-updated buffers is reasonable, is shown in steps 10 and 11.

In step 715, metadata log program 700 records the assignment of a block to a user file. Recording the assignment of a block to a user file is important to preventing the replay of updates to the block, which would otherwise corrupt the user file block, in the event that the system crashes and log file recovery is needed for the file system. Inputs received by metadata log program 700 include the address of the NL_LOG for the file system, and a list of physical block addresses and the length of that list, as included in the field numblks. In an exemplary embodiment of the present invention, recording the assignment of a block to a user file includes the following activities:
   1. Lock NL_LOG.l_active.a_lock in write mode
   2. Set remaining=numblks
   3. Set dataLength=0
   4. If the array anchored at NL_LOG.l_active.a_nub has more room for entries (each one can handle up to 16) then:
      a. Compute dataLength=4*number of remaining entries in the array anchored at NL_LOG.l_active.a_nub
      b. Subtract the number of remaining entries in the array anchored at NL_LOG.l_active.a_nub from remaining
   5. If remaining is >0 then (we need another array to add to the a_nub list)
      a. Add the sizeof the NL_LRECHDR+remaining*4 to dataLength
   6. Add dataLength to both NL_LOG.l_active.a_nubBytes and also NL_LOG.l_active.a_numBytes
   7. If NL_LOG.l_active.a_nub is not NULL and has more room for entries then:
      a. Copy the block addresses from the input list and update the count in the array entry anchored at NL_LOG.l_active.a_nub
   8. If there are more entries from the input list then:
      a. Allocate a new array (size 16) of entries and add that to the front of the list anchored at NL_LOG.l_active.a_nub
      b. Copy the remaining block addresses from the input list (those not copied in step 7) to the newly allocated array and update that arrays count of used entries.
   9. Release the NL_LOG.l_active.a_lock.

In step 720, metadata log program 700 records the deletion of a metadata block. When a task deletes a metadata block from an object (for example, deleting a page from a directory) it will communicate to the log cache that the block is deleted. Input to this processing is the address of the buffer that represents the block. The buffer is locked in write mode before this processing, ensuring the task has exclusive access to it. If there is no NL_BLK attached to the buffer, then metadata log program 700 ends (or exits for the particular metadata block), because the log cache has no update records for that metadata block. If there are NL_BLK structures attached to the metadata buffer, metadata log program 700 sets the B_KILLA flag bit in the NL_BLK.b_killflags byte.

Because the transaction that is deleting the block is active, at this point metadata log program 700 notes that the block has been deleted. As will be discussed in a subsequent step, when the active transaction records are merged with the completed transaction records, active and completed update records (NL_UPDATE) can be deleted because the transaction that is deleting the metadata disk block image will be committed once the records are written to disk. Embodiments of the present invention include the two-step process described, and the deletion of all update records for deleted blocks reduces the number of bytes written to the log as a result of files being truncated and/or removed from directories, and empty directories being deleted.

In step 725, metadata log program 700 merges recently ended activity records with previously completed records. Merging of all of the update records from a recently ended active transaction (NL_BLOCK.l_active.a_tranCount is zero) occurs when the number of bytes in those update records exceeds a certain threshold or some external force is forcing the move of those records to the completed list so the completed list of update records can be written to the log file. Embodiments of the present invention in which active-delay is performed, as a transaction completes logically, the resulting update records are left in the active list; however, in response to the number of bytes represented by those records starting to grow past a threshold, or if an "fsync" or some other syncing occurs, the records left in the active list are merged with the records of the completed transaction record list.

Merge processing is performed with both the NL_LOG.l_active.a_lock and NL_LOG.l_complete.a_lock held in write mode since the process involves moving records from the active list to the complete list and input is the NL_LOG that represents the file system in the log cache. The exemplary algorithm for merge processing is presented.

1. If NL_LOG.l_complete.a_tranCount is 0, then:
   a. Set NL_LOG.l_complete.a_numBytes to size of NL_LRECHDR (to account for the end-transaction record).
2. Add NL_LOG.l_active.a_ranTran to NL_LOG.l_complete.a_tranCount (this is the total number of complete transactions that are represented by the records in the complete list after the merge is complete).
3. Set NL_LOG.l_active.a_ranTran and NL_LOG.l_activeDelayUsed to zero.
4. If NL_LOG.l_active.a_nub is not NULL (new user block list is non-empty):
   a. If there is only one array entry in the NL_LOG.l_active.a_nub list and those blocks will fit in the last array entry in the NL_LOG.l_complete.a_nub list then:
      i. Add those blocks to the last entry in the NL_LOG.l_complete.a_nub list (which is pointed by the NL_LOG.l_complete.a_lastnub pointer)
      ii. Set dataLength=number of entries in the NL_LOG.l_active.a_nub array times 4.
      iii. Add dataLength to NL_LOG.l_complete.a_nubBytes
      iv. Add dataLength to NL_LOG.l_complete.a_numBytes
      v. Free the array entry pointed by NL_LOG.l_active.a_nub
   b. Else (there are multiple array entries pointed by NL_LOG.l_active.a_nub):
      i. Chain the list pointed by NL_LOG.l_active.a_nub/NL_LOG.l_active.a_lastNub to the end of the list pointed by NL_LOG.l_complete.a_nub/NL_LOG.l_active.a_lastNub
      ii. Add NL_LOG.l_active.a_nubBytes to both NL_LOG.l_complete.a_nubBytes and also NL_LOG.l_complete.a_numBytes
5. Loop for every block (NL_BLK) in the list anchored by NL_LOG.l_active.a_firstBlk:
   a. If B_KILLA flag set in NL_BLK.b_killflags (time to toss records):
      i. Set B_KILL flag in NL_BLK.b_flags
      ii. Subtract NL_BLK.b_actBytes from NL_LOG.l_active.a_numBytes (freeing the records) and add the size of NL_LRECHDR to NL_LOG.l_active.a_numBytes (to represent the kill-record that will be written to the log file this block).
      iii. Loop returning NL_UPDATE records in the list anchored at NL_BLK.b_active list.
      iv. Clear the B_FILLACT flag in the NL_BLK.b_flags bit (in addition, existing fill records are logically removed)
      v. Set NL_BLK.b_actNumBytes to size of NL_LRECHDR
   b. If NL_BLK.b_complete is NULL (there are no update records for completed transactions for this block and the active records can simply be moved to the complete list):
      i. Add this NL_BLK to the head of NL_LOG.l_complete.a_firstBlk list (this block is now in the complete list of blocks)
      ii. Set NL_BLK.b_complete to NL_BLK.b_active (records moved to complete list)
      iii. Set B_INCOM bit in the NL_BLK.b_flags (to note it's in the complete list)
      iv. Add NL_BLK.b_actNumBytes to NL_LOG.l_complete.a_numBytes
      v. Set NL_BLK.b_compNumBytes to NL_BLK.b_actNumBytes
      vi. If B_FILLACT flag set then:
         1. Set B_FILLCOM flag bit
         2. Clear B_FILLACT flag bit
   c. Else if the B_KILL flag bit is set in NL_BLK.b_flags (this block has been deleted and the transaction that deleted the block is now being moved to the completed transaction list)
      i. Subtract NL_BLK.b_compNumBytes from NL_LOG.l_complete.a_numBytes (since the complete records can be discarded)
      ii. Add sizeof NL_LRECHDR to NL_LOG.l_complete.a_numBytes (for the kill record that will be written to the log file for this block)
      iii. Loop returning NL_UPDATE records in the list anchored at NL_BLK.b_complete list
      iv. Clear B_FILLCOM flag bit in NL_BLK.b_flags
      v. Set NL_BLK.b_compNumBytes to the size of an NL_LRECHDR (to reflect the kill record that will be written to the log)
   d. Else Loop processing each NL_UPDATE record in the active record list anchored at NL_BLK.b_active and merge that record with the complete list anchored at NL_BLK.b_complete. The reader should note that this processing will be almost exactly the same as steps 5a through 5c of the steps shown in the section that describes updating a metadata block. One difference is that the NL_LOG.l_active.a_lock is held throughout (it's not obtained and released) and when updating counters, the NL_LOG.l_complete.a_numBytes and the NL_BLK.b_compNumBytes are updated instead of the NL_LOG.l_active.a_numBytes and NL_BLK b_compNumBytes. Another difference is that the corresponding NL_UPDATE record from the active list is returned since it's no longer needed. And very similarly, many times there will already be a record in the complete list covering the range in the NL_UPDATE record in the active list.
   e. Loop processing each record (NL_UPDATE) in the list anchored in the NL_BLK.b_complete list:
      i. Set u_copied flag to 0
      ii. If u_offset+u_length+sizeof NL_LRECHDR is larger than the u_offset of the next NL_UPDATE record in the complete list, then the records can be merged (near adjacency):
         1. Set curr_origlen to ceiling of u_length of current entry rounded to a word boundary and add the size of NL_LRECHDR
         2. Set next_origlen to ceiling of u_length of next entry rounded to a word boundary and add the size of NL_LRECHDR 3. Set u_length field in record to u_offset+u_length in the next record and subtract the u_offset from the current record (merge two records into one)
4. Set dataLength=ceiling of u_length rounded to a word boundary and then add the sizeof NL_L-RECHDR
5. Add dataLength to NL_LOG.l_complete.a_numBytes and subtract both curr_origlen and next_origlen
6. Add dataLength to NL_BLK.b_compNumBytes and subtract both corr_origlen and next_origlen
7. Remove the next entry from the list and return it
  f. Clear the NL_BLK.b_active, NL_BLK.b_anext, NL_BLK.b_actNumBytes fields and the B_INACT flag bit.
  g. Free copy buffers anchored in the NL_BLK. They are no longer needed now that the active records are folded into the complete records. The new data is contained in the metadata cache buffer and that data would be used to write to the log file.
6. Clear the following fields in the NL_LOG (the active list is now empty as its been merged into the completed transaction list): a_firstBlk, a_nub, a_lastnub, a_nubBytes, a_tranId, a_numBytes, a_flags, a_tranCount
7. Set numCompletedPages to ceiling of NL_LOG.l_complete.a_numBytes rounded to a 4K page boundary
8. If numCompletedPages is >NL_LOG.l_blocksPerIO
  a. Call the routine that writes completed record updates to the log file. This processing is described in its own section.

The above algorithm shows several aspects of embodiments of the present invention. Noting when blocks are deleted is handled in step 5a and 5c and the benefits are indicated, because the update records can be purged at that time reducing log space. The benefit of granular recording are described in step 5b and 5d. If the completed transaction list is empty, the merge of active records is very fast. If the completed transaction list is non-empty, then it is often the case that the records of the completed transaction list overlap, or wholly contain update records in the active list. In some embodiments of the present invention, in response to a merge of active transaction records with the complete transaction records, the total number of bytes reserved in the log for buffered transaction records is reduced from the original separate bytes reserved before the active records were merged with the completed records. The near-adjacency processing aspect of embodiments of the present invention, which reduces the number of bytes reserved in the log file, is indicated in step 5e.

Sometimes it is desirable to ensure that the metadata update records that describe changes to a particular metadata block are on disk. This can only be done if those update records are in the complete list (not part of the active transaction set of updates). If there are active transaction update records and a task is actively running a transaction (a_tranCount>0) then the task would first have to prevent the start of future transactions and then it can move the active update records to the completed list. Assuming that a buffer does not have active records and there is an active transaction running, then the following algorithm can be used (the input is the address of the buffer structure whose records are to be written to the log file, and the buffer is locked in write mode).

In step 730, metadata log program 700 determines whether records of a block are committed to the log file. Metadata log program 700 performs a test to determine if the updated records of a metadata block have been written to the log file. The exemplary algorithm depicted below indicates the active-delay feature included in some embodiments of the present invention affects forcing update records to disk for a buffer, as step 5 is required to move active records to the complete list if it has not already been done. In some embodiments of the present invention the following pseudo-code represents testing by metadata log program 700 to determine if the updated records of a metadata block have been written to the log file.
  IsCommit(NL_BLK) is TRUE IF:
    ((NL_BLK.b_LogLastPass+1==NL_LOG.l_commitPassno) OR
    ((NL_BLK.b_LogLastPass==NL_LOG.l_commitPassno) && (NL_BLK.b_LogLastOff<=NL_LOG.l_commitOffset)))

The following is the exemplary algorithm for determining whether records of a metadata block have been committed to the log file.
1. If there is no NL_BLK anchored in the buffer structure then this buffer has no update records and thus no processing is performed, return.
2. If the neither the B_INCOM or B_INACT bits and IsCommit(NL_BLK) then return (the records describing the block are on disk)
3. If the B_INACT flag is set (block as records in the active list, and those need to be moved to the complete list):
  a. Lock NL_LOG.l_active.a_lock
4. Lock the NL_LOG.l_complete.a_lock
5. If B_INACT flag is set in NL_BLK.b_flags then:
  a. Move active records to the completed list using the algorithm described in the section titled: "Merging Recently Ended Active Records with Previously Completed Records"
  b. Release NL_LOG.l_active.a_lock
6. Lock NL_LOG.l_lock in write mode
7. If B_INCOM bit set in NL_BLK.b_flags
  a. Write out the list of completed records as described in the section titled: "Writing the Record Update to the Log File".
8. If NOT IsCommit(NL_BLK) then (the IO that is transmitting the log record updates to the log file is still be in-progress, and a wait occurs until the IO transmission of log record updates is complete):
  a. Lock NL_LOG.l_pioLock
  b. If NOT IsCommit(NL_BLK) then:
    i. Scan the NL_PIO list anchored in the NL_LOG.l_pioTail backwards until NL_BLK.b_logLastPass+1=NL_PIO.p_passno OR NL_BLK.b_logLastOff<=NL_PIO.p_offset (which means the pending IO might have records that describe changes to this buffer).
    ii. Set NL_PIO.p_waiter=1
    iii. Release the locks and sleep until woken up (which will occur when the IO completes)
    iv. Goto step 1
  c. Release NL_LOG.l_pioLock
9. Release held locks In step 735 metadata log program 700 determines if the log file has adequate available space, and if not, performs Log File Full Processing. Log full processing occurs when there are dirty metadata buffers pinning the tail of the log which prevents new transactions from starting. To clear the condition involves the oldest dirty metadata buffers to be written to disk. Some of the processing involves metadata cache and IO processing in which the IO facilities of the operating system and file system associated with embodiments of the present invention, allow a calling task to specify multiple disk blocks in one IO with multiple memory buffer addresses used for the transfer, without specifying the order of blocks or memory addresses. An IO structure in memory is used to refer to an IO, and a set of IOs can be created with IO structures added to the set. The calling task can wait on a set of IOs by passing the address of the IO structure that represents the set. The metadata cache like most caches, allows a caller to pin or get access to a buffer structure with the guarantee that the structure will not be freed until the caller has indicated it is done using the structure. In some embodiments of the present invention, the logic used will write at most 32 metadata blocks in one IO and will schedule as many IOs as is needed to write out the metadata blocks that are pinning the tail of the log.

In some embodiments of the present invention, log full processing involves the NL_LOG.l_complete.a_lock and NL_LOG.l_lock locks being held in write mode at the start of processing. The input received is the NL_LOG representing the file system and the caller is often a task wanting to start a transaction, but cannot, because the log file is full or has inadequate available space to accommodate updates to be made for the pending transaction. The following exemplary algorithm presents the activities of performing log file full processing:

1. Set LOG_FULL_PROCESSING flag bit in NL_LOG.l_flags
2. If NL_LOG.l_complete.a_numBytes>0 AND (NL_LOG.l_pinnedSize<NL_LOG.l_totalSize−NL_LOG.l_logReclaim) then to ensure that log full makes the desired progress, the completed transaction records are written out:
    a. Write out the list of completed records as described in the section titled: "Writing the Record Updates to the Log File."
3. Release NL_LOG.l_complete.a_lock
4. Obtain a memory buffer M to hold the addresses of up to 256 buffer structure addresses and the physical block number of each buffer (an array of 256 slots where each slot contains both a buffer structure address and the physical block number where the metadata block resides on disk).
5. Compute pages=ceiling of (NL_LOG.l_complete.a_numBytes rounded up to 4K pages)
6. Compute Off=NL_LOG.l_nextLogBlk+pages
7. If Off>=NL_LOG.l_totalSize then (increment pass number):
    a. Set pass=NL_LOG.l_passno+1
    b. Subtract NL_LOG.l_totalSize from Off
8. Else pass=NL_LOG.l_passno
9. Loop processing NL_BLKs anchored in NL_LOG.l_o-firsttail until array M is filled in or the end of the list is reached:
    a. Save the NL_BLK address and its physical block number in the next slot in the array M
10. Use a quicksort algorithm to sort the buffers by physical address (to reduce disk head movement). Quicksort is well known in the art.
11. Loop processing the entries in the sorted array M:
    a. Obtain a hold on the metadata cache buffer B to indicate use of the buffer structure pointed to by the next slot in array M
    b. Release NL_LOG.l_lock
    c. Lock the buffer B in write mode.
    d. Obtain the NL_BLK anchored in the buffer structure B
    e. If the NL_BLK.b_flags B_KILL bit is set AND neither the B_INCOM or B_INACT bits are set (the block was deleted and the transaction records that have freed the block have been scheduled to disk):
        i. Perform the steps described in "Forcing Transaction Updates to the Log File for a Buffer" to ensure that the IO that scheduled the update records to disk has completed
        ii. Remove the NL_BLK from the age queue anchored in NL_LOG.l_ofirsthead/NL_LOG.l_ofirsttail and also the ordered-last queue anchored at NL_LOG.l_olasthead/NL_LOG.olasttail
    f. Else if the buffer is dirty then:
        i. If there are already 32 buffers as part of a current IO structure, then schedule the IO to disk and then create a new IO structure
        ii. Add this buffer to the current IO structure
    g. Release lock on buffer and then indicate to the metadata cache that the task is done using the buffer.
    h. Obtain the NL_LOG.l_lock in write mode
    i. Because the lock on the NL_LOG has been released during the processing, the state of the log could have changed, compute: totalPages=NL_LOG.l_pinnedSize+ceiling of (NL_LOG.l_complete.a_numBytes rounded up to 4K pages)
    j. If totalPages<=(NL_LOG.l_totalSize−NL_LOG.l_logReclaim) (enough of the log is unpinned now, so the processing of the loop can stop):
        i. Break from the loop
12. If there are buffers added to the IO structure then schedule the IO now for the last set of buffers.
13. Loop processing buffers in the sorted array M:
    a. If coincidentally, the buffer is no longer in the age queue (due to processing of other tasks) then continue to the next entry
    b. Obtain a hold on the metadata cache buffer B to indicate use of the buffer structure pointed to by the next slot in array M
    c. Release NL_LOG.l_lock
    d. Lock the buffer B in write mode.
    e. Obtain the NL_BLK anchored in the buffer structure B
    f. If the buffer structure indicates its pending IO (the typical case since the IO was scheduled during previous steps):
        i. Add the IO structure used for the IO for this buffer to an IO set S
    g. Release lock on buffer and then indicate to the metadata cache that the task is done using the buffer.
    h. Obtain the NL_LOG.l_lock in write mode
    i. Because the lock on the NL_LOG has been released during the processing, the state of the log could have changed, compute: totalPages=NL_LOG.l_pinnedSize+ceiling of (NL_LOG.l_complete.a_numBytes rounded up to 4K pages)
    j. If totalPages<=(NL_LOG.l_totalSize−NL_LOG.l_logReclaim) (enough of the log is unpinned now, so processing of the loop can stop):
        i. Break from the loop
14. Wait on the IO set S for the IOs in the set to be complete, this step will also ensure that the buffers are removed from the age queues NL_LOG.l_ofirsthead/NL_LOG.ofirsttail and NL_LOG.olasthead/NL_LOG.olasttail
15. Delete the IO set S.
16. Set TotalPages=NL_LOG.l_pinnedSize+ceiling of (NL_LOG.l_complete.a_numBytes rounded up to 4K pages)
17. If totalPages>(NL_LOG.l_totalSize−NL_LOG.l_logReclaim)
   a. Goto step 5
18. Release memory buffer M In step 740, metadata log program ends a transaction. When a task is done making updates to metadata it will call the end-transaction routine to end the transaction. Because multiple tasks might logically share the same transaction, the transaction could still be active. The input to the step 740 is the NL_LOG of the file system and the transaction identifier (tranId) that is being ended, which will be the active transaction, because at this point there are only active or completed transactions. The exemplary algorithm for ending a transaction is presented below:

1. Lock NL_LOG.l_active.a_lock in write mode
2. Decrement NL_LOG.l_active.a_tranCount
3. If NL_LOG.l_active.a_tranCount=0 then:
   a. Set NL_LOG.l_activeDelayUsed=NL_LOG.l_active.a_numBytes (this is the number of bytes used by ended active transactions, whose movement to the completed record list could be delayed for performance)
   b. Lock the NL_LOG.l_complete.a_lock in write mode
   c. Set NL_LOG.l_activeTranPages=0
   d. Set numCompletedPages=ceiling of (NL_LOG.l_complete.a_numBytes expressed in 4K pages)+ceiling of (NL_LOG.l_active.a_numBytes expressed in 4K pages)
   e. If NL_LOG.l_active.a_maxtranwt OR NL_LOG.l_active.a_lowspacetranwt OR A_TRANFORCE flag is set in NL_LOG.l_active.a_flags set OR numCompletedPages>NL_LOG.l_blocksPerIO
      i. Merge active records with the completed transaction records. This processing was described in the section: "Merging Recently Completed Active Records with Previously Completed Records", steps 1-5.
   f. Perform steps 6 through 8 described in section "Merging Recently Completed Active Records with Previously Completed Records" section.
4. If NL_LOG.l_active.a_maxtranwt AND NL_LOG.l_active.a_tranCount=0 AND the A_TRANFORCE bit is not on in NL_LOG.l_active.a_flags:
   a. Wakeup up any tasks sleeping waiting to start a transaction due to maximum space used in the log.
   b. Clear NL_LOG.l_active.a_maxtranwt
5. If NL_LOG.l_active.a_lowspacetranwt AND NL_LOG.l_active.a_tranCount=0 then (tasks are waiting because too much of the log is pinned by un-written dirty metadata buffers):
   a. Lock NL_LOG.l_lock in write mode
   b. Release NL_LOG.l_active.a_lock
   c. Perform the steps described in "Log Full Processing" which writes out dirty metadata buffers to free the oldest log pages in the log file for over-write.
   d. Wakeup tasks waiting on NL_LOG.l_active.a_lowspacetranwt
   e. Clear NL_LOG.l_active.a_lowspacetranwt
   f. Release NL_LOG.l_lock
6. Release locks still held Implicit in the above logic is the fact that when a transaction ends, even if the active transaction count is zero, the update records for the active transaction records are not moved immediately to the completed list to enable the active-delay feature of embodiments of the present invention. Rather, if there are not tasks waiting on the movement of those records, such as for an "fsync" operation, for example, and there are not too many updated bytes in those active records, the next started transaction updates are merged with the prior active transactions.

In step 745, metadata log program 700 writes the record updates to the log file. Writing the record updates to the log file involves processing of the update records for the updated metadata blocks in the completed record list. An NL_PIO structure is created to represent the IO which anchors the memory buffers that contain the in-memory copy of the log file pages, which is transmitted to the actual log file on disk via a request to the IO subsystem. It also involves updating many fields in the NL_LOG structure for the file system. Input to metadata log program 700 is the NL_LOG that represents the file system and the NL_LOG.l_complete.a_lock field is held in write mode. The exemplary algorithm for writing the record updates to the log file is presented below:

1. If not already locked, obtain the NL_LOG.l_lock in write mode
2. Calculate numCompletedPages=ceiling of (NL_LOG.l_complete.a_numBytes rounded to 4K pages)—this is the number of 4K pages that will be written to the log file.
3. Obtain storage for an NL_PIO structure
4. Set NL_PIO.p_passno=NL_LOG.l_passno
5. Set NL_PIO.p_offset=NL_LOG.l_nextLogBlk
6. Set NL_PIO.p_tranId=NL_LOG.l_complete.a_tranId
7. Initialize other NL_PIO fields that are related to the IO subsystem used, outside the scope of the invention and not relevant to the claims
8. Obtain memory for the first 4K page and anchor the page in the NL_PIO, call the address of this page HDRP.
9. INITIALIZE_PAGE_HEADER—to initialize the NL_LPAGEHDR for the page—this processing is described in the next section.
10. Set priorOffset=0
11. Loop processing the entries in the NL_NUB list anchored in NL_LOG.l_complete.a_nub (this is the new-user file block list, and has to be recorded into the log file):
    a. Calculate fitsCount=(4096−HDRP.nextLogRecOff−size of NL_LRECHDR)/4 (4 is the size of a physical block number in the embodiment, many systems use 8 byte or large block numbers).
    b. Calculate dataLength=MIN(NL_NUB.n_count, fitsCount)*4
    c. FILL_IN_RECORD (HDRP, NL_NUBR, 0, 0, priorOffset, dataLength, NL_NUB.n_blocks)—copy the blocks numbers from the NL_NUB to the data area of the record and fill in the record header. This routine is described in the next section. Call the address of this record RECP.
    d. Add size of NL_LRECHDR+RECP.dataLength to HDRP.nextLogRecOff
    e. If HDRP.nextLogRecOff>=(4096−size of NL_LRECHDR) (no more room for entries in this page, move to another page):

i. Obtain memory for a 4K page and anchor the page in the NL_PIO, call the address of this page HDRP.
ii. INITIALIZE_PAGE_HEADER to initialize the page header in the output page.
iii. Set priorOffset=0
iv. If fitsCount<NL_NUB.n_blocks (left over from the prior NL_NUB, need to copy the remaining blocks of the NL_NUB to this first record of the new page. A NL_NUB contains at most 32 blocks and its known there will be no remaining blocks after this copy to the output page):
  1. Calculate dataLength=(NL_NUB.n_count−fitsCount)*4
  2. FILL_IN_RECORD (HDRP, NL_NUBR, 0, 0, priorOffset, dataLength, &NL_NUB.n_blocks[fitsCount])—copy the rest of the blocks in the NL_NUB array to the output record.
  3. Goto step 11d to continue processing.
12. Loop returning the NL_NUB structures in the list anchored at NL_LOG.l_complete.a_nub
13. Subtract NL_LOG.l_complete.a_nubBytes from NL_LOG.l_complete.a_numBytes
14. Set NL_LOG.l_complete.a_nub and NL_LOG.l_complete.a_lastNub to 0
15. Loop processing the NL_BLKs anchored at NL_LOG.l_complete.a_firstBlk:
  a. Obtain NL_BLK.b_flagLock in write mode (this routine updates flag bits but does not hold the buffer lock on the metadata blocks like many of the other routines did).
  b. If the B_KILL bit is on in the NL_BLK.b_flags byte (block as deleted by this a transaction that has completed):
    i. FILL_IN_RECORD(HDRP, NL_KILL, NL_BLK.b_block, 0, priorOffset, 0, 0)
    ii. Add size of NL_LRECHDR to HDRP.nextLogRecOff
    iii. If HDRP.nextLogRecOff>=(4096−size of NL_LRECHDR) then:
      1. Obtain memory for a 4K page and anchor the page in the NL_PIO, call the address of this new page HDRP
      2. INITIALIZE_PAGE_HEADER to initialize the page header in the output page.
      3. Goto Step 15.g
  c. If the B_FILLCOM bit is set in the NL_BLK.b_flags byte then (copy the fill bytes to a record):
    i. FILL_IN_RECORD(HDRP, NL_FILL, NL_BLK.b_block, NL_BLK.b_fillOffset, priorOffset, NL_BLK.b_fillLength, NL_BLK.b_fillByte)
    ii. Add size of NL_LRECHDR to HDRP.nextLogRecOff
    iii. If HDRP.nextLogRecOff>=(4096−size of NL_LRECHDR) then:
      1. Obtain memory for a 4K page and anchor the page in the NL_PIO, call the address of this new page HDRP
      2. INITIALIZE_PAGE_HEADER to initialize the page header in the output page.
  d. Loop processing the of the update records (NL_UPDATE) anchored at NL_BLK b_complete:
    i. Set leftover=NL_UPDATE.u_length
    ii. Set fitsCount=4096−size of NL_LRECHDR−HDRP.nextLogRecOff (this is the number of data bytes from the update record that can fit into the remaining portion of the page)
    iii. If fitsCount>0 then:
      1. If NL_UPDATE.u_copied then:
        a. Set BA=Address of data in the copy buffers (anchored at NL_BLK.b_compUpdates)
      2. Else:
        a. Set BA=Address of data in the metadata buffer at offset NL_UPDATE.u_offset (the NL_BLK points to the buffer which points to the in-memory copy of the metadata page)
      3. Set dataLength=MIN(fitsCount, leftover)
      4. FILL_IN_RECORD(HDRP, NL_NEWDATA, NL_BLK.b_block, NL_UPDATE.u_offset, priorOffset, dataLength, BA)
      5. Add size of NL_LRECHDR+dataLength (rounded to a word boundary) to HDRP.nextLogRecOff
    iv. If HDRP.nextLogRecOff>(4096−size of NL_LRECHDR) then:
      1. Obtain memory for a 4K page and anchor the page in the NL_PIO, call the address of this new page HDRP.
      2. INITIALIZE_PAGE_HEADER to initialize the page header in the new output page.
      3. If fitsCount<leftover then:
        a. Subtract fitsCount from leftover
        b. Set fitsCount=4096−sizeof NL_LRECHDR−sizeof (NL_LPAGEHDR)
        c. Set dataLength=MIN(fitsCount, leftover)
        d. If NL_UPDATE.u_copied then:
          i. Set BA=Address of data in the copy buffers (anchored at NL_BLK.b_compUpdates adjusted by NL_UPDATE.u_length−leftover)
        e. Else
          i. Set BA=Address of data in the metadata buffer at offset NL_UPDATE.u_offset adjusted by NL_UPDATE.u_length−leftover)
        f. FILL_IN_RECORD(HDRP, NL_NEWDATA, NL_BLK.b_block, NL_UPDATE.u_offset+NL_UPDATE.u_length−leftover, priorOffset, dataLength, BA)
        g. Goto step 15.d.iii.5
    e. Loop returning the update records anchored at NL_BLK.b_complete
    f. Free copy buffers anchored at NL_BLK.b_compUpdates
    g. Set NL_BLK.b_complete and NL_BLK.b_compNumBytes to 0
    h. If HDRP.nextLogRecOff=sizeof NL_LPAGEHDR (we allocated a new page, but did not fill in the new page, so adjust last block numbers downward):
      i. If HDRP.pageNumber=0 then:
        1. NL_BLK.b_LogLastPass=HDRP.passNumber−1
        2. NL_BLK.b_LogLastOff=NL_LOG.l_totalSize−1
      ii. Else:
        1. NL_BLK.b_LogLastPass=HDRP.passNumber
        2. NL_BLK.b_LogLastOff=HDRP.pageNumber−1
    i. Else
      i. NL_BLK.b_LogLastPass=HDRP.passNumber
      ii. NL_BLK.b_LogLastOFf=HDRP.pageNumber
    j. Clear the B_INCOM and B_FILLCOM flag bits in NL_BLK.b_flags
    k. If NL_BLK is not at the head of the ordered-last queue (NL_LOG.l_olasthead) and the B_INACT bit is not set in NL_BLK.b_flags then move this block to the most recent position in the ordered-last queue:
i. If B_INOLAST flag bit is not set in the NL_BLK.b_logflags then:
1. Add to the head of the oldest-last queue.
l. Release NL_BLK.b_flagLock
16. FILL_IN_RECORD (HDRP, NL_ENDTRAN, 0, 0, priorOffset, 0, 0)—write out the end-transaction record. It is guaranteed there is space in the current memory buffer.
17. Clear the following fields: NL_LOG.l_complete.a_firstBlk, NL_LOG.l_complete.a_tranId, NL_LOG.l_complete.a_numBytes, NL_LOG.l_complete.a_ranTran, NL_LOG.l_complete.a_tranCount, NL_LOG.l_complete.a_nub, NL_LOG.l_complete.a_lastnub, NL_LOG.l_complete.a_nubBytes
18. Add NL_PIO.p_count (the number of pages being written to the log file for this IO) to NL_LOG.l_pinnedSize
19. Create an IO structure to represent the IO to the IO subsystem
20. Indicate to the IO subsystem that a routine LogIODone should be called when the IO completes. The embodiment of the invention was made on a system where the IO subsystem allows the caller to specify a sub-routine to run when an IO is complete.
21. Lock the NL_LOG.l_piolock in write mode.
22. Add the NL_PIO to the head of the IO queue anchored at NL_LOG.l_piohead
23. Release the NL_LOG.l_piolock
24. Issue the IO to the IO subsystem. When the IO completes, the IO subsystem will run the routine LogIODone asynchronously with respect to this logic.
25. Release the NL_LOG.l_lock if the lock was not held on input.

The module of metadata log program 700 that performs writing out the cached metadata update records to the log file on disk has logic relevant to the granular recording of metadata throughout. Noting when a block is killed for performance is handled in step 15.b and the ordered-last queue aspect of the invention has relevant logic in step 15.k.

In an alternative embodiment of the present invention, bit masks may be used to indicate if a particular byte range has been updated instead of using lists of update records in memory when recording updates to the individual buffers (NL_BLKs as shown in FIG. 4). For example, one of average skill in the art will note that if a bit was assigned for each word of a buffer containing an in-memory (in-core) image of a metadata disk block, and if the metadata disk block was 8K, then 2048 bits would be used to track and determine which 4 byte words of the buffer have been updated. Thus, only 256 bytes would be consumed to represent the possible updated regions. Recording which regions are updated would be as simple as setting corresponding bits or bytes to binary ones. Merging recently completed active records, with prior completed records would be as simple as bitwise ORing. Writing out transaction records to disk would involve scanning the bytes in the bitmask for ones and copying the relevant regions to the log file. This alternative might slightly increase the number of bytes written to the log, but it could result in a non-trivial processing cost reduction.

Figure 8:
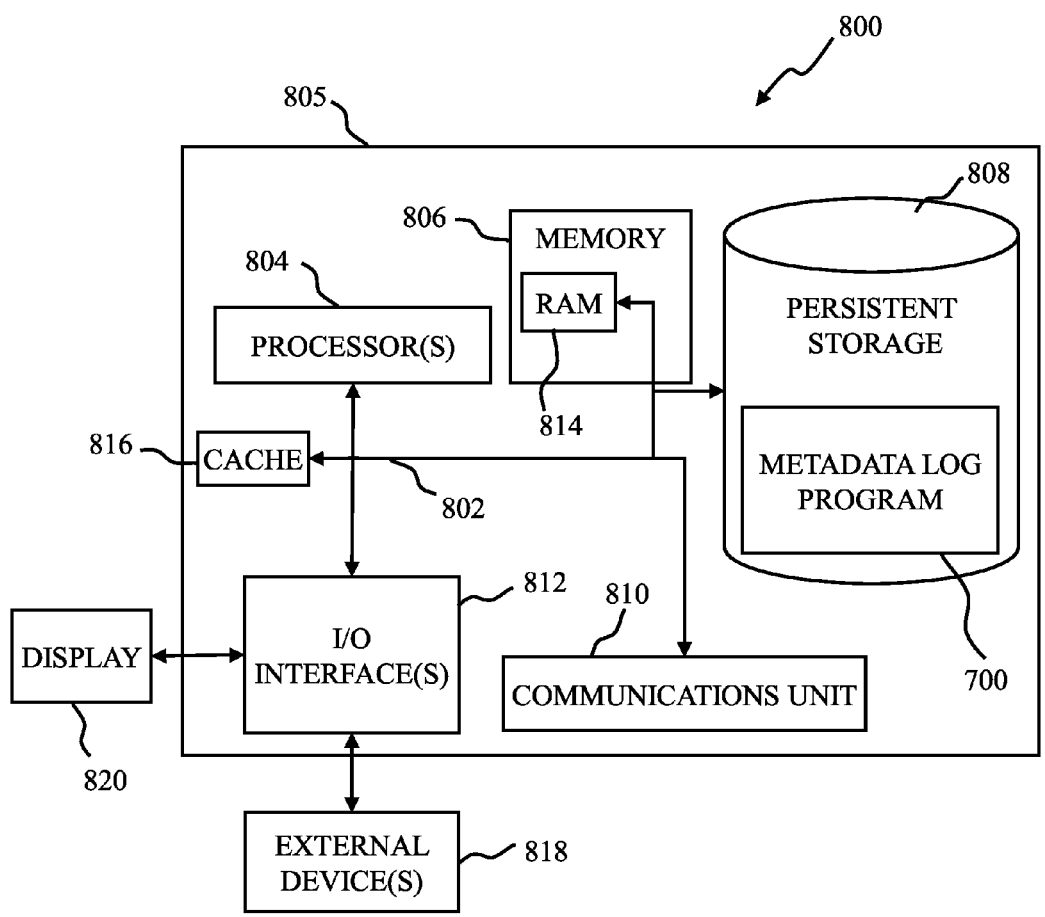
FIG. 8 depicts a block diagram of components of a computing system, including a computing device capable of performing the operational steps of the metadata log program, in accordance with an embodiment of the present invention.

FIG. 8 depicts a block diagram of components of computing system 800, including computing device 805, capable of performing the operational steps of metadata log program 700, in accordance with an embodiment of the present invention.

Computing device 805, includes components and functional capability similar to file system server 110 in accordance with an illustrative embodiment of the present invention. It should be appreciated that FIG. 8 provides only an illustration of one implementation and does not imply limitations with regard to the environments in which different embodiments may be implemented. Many modifications to the depicted environment may be made.

Computing device 805 includes communications fabric 802, which provides communications between computer processor(s) 804, memory 806, persistent storage 808, communications unit 810, and input/output (I/O) interface(s) 812. Communications fabric 802 can be implemented with an architecture designed for passing data and/or control information between processors (such as microprocessors, communications and network processors, etc.), system memory, peripheral devices, and other hardware components within a system. For example, communications fabric 802 can be implemented with one or more buses.

Memory 806, cache memory 816, and persistent storage 808 are computer readable storage media. In this embodiment, memory 806 includes random access memory (RAM) 814. In general, memory 806 can include suitable volatile or non-volatile computer readable storage media.

Metadata log program 700 is stored in persistent storage 808 for execution by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices, including resources of distributed file system journaling environment 100 and file system server 110. In these examples, communications unit 810 includes one or more network interface cards. Communications unit 810 may provide communications through the use of either or both physical and wireless communications links. Metadata log program 700 may be downloaded to persistent storage 808 through communications unit 810.

I/O interface(s) 812 allows for input and output of data with other devices that may be connected to computing system 800. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., metadata log program 700 can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for recording metadata updates of file systems, the method comprising:
   one or more computer readable storage media wherein the computer readable storage medium is not a transitory signal per se, and program instructions stored on the one or more computer readable storage media, the program instructions comprising:
   program instructions to detect an in-memory image of a metadata disk block;
   program instructions to record in a buffer, metadata updates made to the in-memory image of the metadata disk block by a first transaction and a second transaction of a plurality of transactions, and a first byte range and a second byte range of the metadata disk block to which respective metadata updates of the first transaction and the second transaction are made, wherein the second transaction is subsequent to the first transaction;
   program instructions to delay moving the metadata associated with the first byte range of the first transaction and the metadata associated with the second byte range of the second transaction from an active transaction list to a completed transaction list, in response to the second byte range being within a specified proximity of the first byte range; and
   program instructions to perform one write operation of metadata updates that results from a combination of the first transaction and the second transaction, in response to the second byte range being within a specified proximity of the first byte range.

2. The computer program product of claim 1, wherein program instructions to record in a buffer, metadata updates made to the in-memory image of the metadata disk block includes tracking and recording metadata updates of a transaction of the plurality of transactions, at an individual byte range, wherein the individual byte range includes an offset location of a range of bytes within the in-memory image of the metadata disk block.

3. The computer program product of claim 1, wherein bit masks are used to track and record metadata updates to the in-memory image of the metadata disk block.

4. The computer program product of claim 1, wherein program instructions to record in a buffer, metadata updates made to the in-memory image of the metadata disk block, further comprises:
   program instructions to record a list of byte ranges of the metadata disk block, each byte range corresponding to the metadata updates performed by a corresponding transaction of the plurality of transactions, and wherein the list of byte ranges of the metadata disk block includes byte ranges of transactions that are active, and byte ranges of transactions that are complete and not yet written to disk; and
   program instructions to merge, at least two byte ranges of the list of byte ranges of the metadata disk block, corresponding to at least two transactions of the plurality of transactions, in response to the byte ranges of two or more transactions being within a specified proximity.

5. The computer program product of claim 1, wherein program instructions to perform one write operation of metadata updates resulting from the first transaction and the second transaction, in response to the second byte range being within a specified proximity of the first byte range, further comprises:
   in response to the second byte range being exclusive of the first byte range, program instructions to determine that an offset of the second byte range is within a specified proximity of an offset of the first byte range; and
   responsive to determining that the offset of the second byte range is within the specified proximity of the offset of the first byte range, program instructions to merge the first byte range and the second byte range into a single byte range of metadata updates.

6. The computer program product of claim 1, wherein program instructions to perform one write operation of metadata updates resulting from the first transaction and the second transaction, in response to the second byte range being within a specified proximity of the first byte range, further comprises:
   in response to a portion of the second byte range being inclusive of the first byte range, program instructions to merge the first byte range and the second byte range into a single byte range of metadata updates.

7. The computer program product of claim 1, further comprising:
   program instructions to apply an oldest-last queue of metadata update records to track metadata buffers that have not been updated within a specified amount of time, wherein the oldest-last queue is sorted on a last page of a log file that contains records describing metadata updates made to a corresponding buffer;
   program instructions to identify metadata disk blocks as candidates to be scheduled to write to disk asynchronously, based on an absence of recent updates and an absence of active transactions performing updates to the metadata disk block; and
   program instructions to perform an asynchronous write to disk of the metadata disk blocks that are identified as candidates, and increasing a time interval between writing of the in-memory image of metadata disk block to disk.

8. A computer system for recording metadata updates of file systems, the computer system comprising:
   one or more computer processors, one or more computer readable storage media, program instructions stored on the computer readable storage media for execution by at least one of the one or more processors, the program instructions comprising:
   program instructions to detect an in-memory image of a metadata disk block;
   program instructions to record in a buffer, metadata updates made to the in-memory image of the metadata disk block by a first transaction and a second transaction of a plurality of transactions, and a first byte range and a second byte range of the metadata disk block to which respective metadata updates of the first transaction and the second transaction are made, wherein the second transaction is subsequent to the first transaction;
   program instructions to delay moving the metadata associated with the first byte range of the first transaction and the metadata associated with the second byte range of the second transaction from an active transaction list to a completed transaction list, in response to the second byte range being within a specified proximity of the first byte range; and
   program instructions to perform one write operation of metadata updates that results from a combination of the first transaction and the second transaction, in response to the second byte range being within a specified proximity of the first byte range.

9. The computer system of claim 8, wherein program instructions to record in a buffer, metadata updates made to the in-memory image of the metadata disk block includes tracking and recording metadata updates of a transaction of the plurality of transactions, at an individual byte range, wherein the individual byte range includes an offset location of a range of bytes within the in-memory image of the metadata disk block.

10. The computer system of claim 8, wherein program instructions to record in a buffer, metadata updates made to the in-memory image of the metadata disk block, further comprises:
    program instructions to record a list of byte ranges of the metadata disk block, each byte range corresponding to the metadata updates performed by a corresponding transaction of the plurality of transactions, and wherein the list of byte ranges of the metadata disk block includes byte ranges of transactions that are active, and byte ranges of transactions that are complete and not yet written to disk; and
    program instructions to merge, at least two byte ranges of the list of byte ranges of the metadata disk block, corresponding to at least two transactions of the plurality of transactions, in response to the byte ranges of two or more transactions being within a specified proximity.

11. The computer system of claim 8, wherein program instructions to perform one write operation of metadata updates resulting from the first transaction and the second transaction, in response to the second byte range being within a specified proximity of the first byte range, further comprises:
    in response to the second byte range being exclusive of the first byte range, program instructions to determine that an offset of the second byte range is within a specified proximity of an offset of the first byte range; and
    responsive to determining that the offset of the second byte range is within the specified proximity of the offset of the first byte range, program instructions to merge the first byte range and the second byte range into a single byte range of metadata updates.

12. The computer system of claim 8, wherein program instructions to perform one write operation of metadata updates resulting from the first transaction and the second transaction, in response to the second byte range being within a specified proximity of the first byte range, further comprises:
    in response to a portion of the second byte range being inclusive of the first byte range, program instructions to merge the first byte range and the second byte range into a single byte range of metadata updates.

13. The computer system of claim 8, further comprising:
    program instructions to apply an oldest-last queue of metadata update records to track metadata buffers that have not been updated within a specified amount of time, wherein the oldest-last queue is sorted on a last page of a log file that contains records describing metadata updates made to a corresponding buffer;
    program instructions to identify metadata disk blocks as candidates to be scheduled to write to disk asynchronously, based on an absence of recent updates and an absence of active transactions performing updates to the metadata disk block; and
    program instructions to perform an asynchronous write to disk of the metadata disk blocks that are identified as candidates, and increasing a time interval between writing of the in-memory image of metadata disk block to disk.

\* \* \* \* \*